United States Patent [19]
Hills

[11] Patent Number: 5,462,653
[45] Date of Patent: Oct. 31, 1995

[54] APPARATUS FOR CONTINUOUS POLYMER FILTRATION

[75] Inventor: William H. Hills, Melbourne Village, Fla.

[73] Assignee: Hills, Inc., West Melbourne, Fla.

[21] Appl. No.: 196,867

[22] Filed: Feb. 15, 1994

[51] Int. Cl.⁶ .................................................. B01D 33/00
[52] U.S. Cl. ...................... 210/85; 210/323.1; 210/323.2; 210/330; 210/340; 425/199
[58] Field of Search .............................. 210/85, 232, 237, 210/238, 323.1, 323.2, 328, 329, 330, 340, 341; 425/197, 198, 199

[56] References Cited

U.S. PATENT DOCUMENTS

| | | | |
|---|---|---|---|
| 3,243,849 | 4/1966 | Joukainen | 210/340 |
| 3,455,357 | 7/1969 | Zink | 425/199 |
| 3,503,096 | 3/1970 | Marianelli | 210/341 |
| 3,669,166 | 6/1972 | Colin | 425/199 |
| 3,727,767 | 4/1973 | Itter et al. | 210/341 |
| 3,940,222 | 2/1976 | Zink | 210/341 |
| 3,994,810 | 11/1976 | Schaeffer | 210/103 |
| 4,167,384 | 9/1979 | Shirato et al. | 425/199 |
| 4,202,659 | 5/1980 | Kinoshita | 425/199 |
| 4,511,472 | 4/1985 | Trott | 210/340 |
| 4,701,118 | 10/1987 | Koching et al. | 425/196 |
| 4,738,607 | 4/1988 | Nakajima et al. | 425/198 |
| 4,752,386 | 6/1988 | Schulz et al. | 425/199 |
| 4,755,290 | 7/1988 | Neuman et al. | 425/199 |
| 4,921,607 | 5/1990 | Langley | 425/199 |
| 5,004,414 | 4/1991 | Stude et al. | 425/199 |
| 5,090,887 | 2/1992 | Gneuss | 425/199 |
| 5,122,286 | 6/1992 | Kreyenborg et al. | 425/197 |
| 5,125,823 | 6/1992 | Kreyenborg | 425/199 |
| 5,200,077 | 4/1993 | McNeice et al. | 210/330 |

Primary Examiner—Robert A. Dawson
Assistant Examiner—Robert J. Popovics

[57] ABSTRACT

An improved continuous large area polymer filter employs a single valve to control molten polymer flow into and out from at least two but preferably three or more filter assemblies. In a neutral position the valve apportions flow equally to each of the filter assemblies. When filters in any one of the assemblies becomes clogged and requires cleaning or replacement, the valve is repositioned to prevent flow into and out from the clogged assembly while continuing to apportion flow among the remaining assemblies. A small amount of polymer is bled from the selected assembly to effect depressurization and the assembly is removed, restored to function and replaced. The valve is repositioned to allow a slow bleeding of polymer into the restored assembly and the bleed valve is opened to allow air and air entrapped polymer to be removed from the assembly before returning it to service. When the bleed valve flow has stabilized the valve is once again repositioned to allow full flow into and out from the serviced assembly and to apportion flow to each assembly. The valve has mechanical stops to prevent flow from being blocked to all of the assemblies simultaneously and a shield is attached to the valve to prevent access to operating assemblies. The shape of the filter cavities is tapered toward the output end to reduce the volume of molten polymer entrapped stagnantly between the cavity and the filter therein.

29 Claims, 26 Drawing Sheets

NO. 1 = CANDLES 26+27
NO. 2 = CANDLES 28+29
NO. 3 = CANDLES 30+31

APPARATUS FOR CONTINUOUS POLYMER FILTRATION

BACKGROUND OF THE INVENTION

1. Technical Field

The present invention pertains to purification and filtration of molten polymer and, more particularly, to an improved method and apparatus for changing filters in a continuous polymer extrusion process.

2. Discussion of the Prior Art

In extruding articles of small cross-section from thermoplastic polymers such as polyethylene, Nylon, polyester, polystyrene, etc., it is necessary to filter foreign material from the molten polymer. Two common examples of such articles are synthetic textile fibers and thin plastic films of the type used in packaging or for tapes (e.g., computer tape, sound recording tape, etc.). In the production of synthetic textile fibers, which may have a final diameter of as little as ten microns, a particle of foreign matter of five or more microns diameter is quite likely to cause breakage of the fiber during manufacturing. It is desirable, therefore, to filter out any foreign material above a certain size.

In the manufacture of the polymers themselves, a final step is often a pelletizing operation where a filter is used to remove any impurities from the final pellets. One form of impurity is a so-called "gel", a region in the molten polymer which has much higher than average viscosity due to excessive polymer molecular weight or cross-linking of polymer molecules. For some articles, such as very thin film and textile fibers, the gels degrade the product quality and are desirably removed by filtration, either at the time the polymer is manufactured, or in-line, upstream of the extrusion of the final product. In all of these processes, it is desirable to be able to replace dirty filter media (usually woven wire screen) with clean media without interrupting the extrusion process and without introducing air to the polymer stream, since air introduced to the polymer stream would end up as bubbles in the extruded article, rendering it defective. A polymer filter having the capability of changing media without interrupting the extrusion operation is generally called a "continuous polymer filter" or "continuous screen changer".

Numerous types of polymer filters are known in the prior art. A very common type is the so-called screen changer, an early model of which is shown in U.S. Pat. No. 3,007,199 (Curtis). Screen changers typically have a relatively small area of filter medium or screen for a given flow rate of molten polymer. A filter area of one square inch of screen for flow rates of thirty to seventy pounds per hour of polymer is typical of screen changers. For instance, an extruder of 4.5 inches screw diameter at full production can melt 600 to 1100 pounds per hour of polymer and is commonly fitted with a screen changer using screens of 4.5 inches diameter or 15.9 square inches of area. This yields a flow rate of approximately thirty-eight to sixty-nine pounds per hour per square inch of filter area. It would be very unusual but possible to use a screen changer with screens bigger than eight inches diameter on a 4.5 inch extruder. This would yield fifty square inches of area or twelve to twenty-two pounds per hour of polymer flow per square inch of filter area. In any case, screen changers of this type are suitable to remove dust, dirt, metal particles and pigment agglomerates down to a micron size of about forty, more often one hundred microns.

Gel removal, on the other hand, requires filtration by media having a micron rating of twenty or finer, and typically a greater "depth" or thickness of media is used than when merely removing dirt. Gels are amoeba-like in that they can change shape to pass through normal filter screens and then resume a more compact shape downstream of the screen. The combination of finer media and a greater thickness of media tends to cause a very high pressure drop through the filter unless a large area of filter media is used. For this reason, filters for gel removal normally have one square inch of filter area for each 0.20 to 0.70 pounds per hour of polymer flow. A filter used with a 3.5 inch diameter screw extruder having a melt rate of 350 pounds/hour would have a filter media area of about 1300 square inches, or nine square feet. These large area filters are not only useful for molten polymer, but also for solutions of polymer (so-called dopes). Polymer solutions (as used to make spandex or acrylic fibers) are lower in viscosity than polymer melts, so somewhat less filter area is needed to remove the gels that are common in these dopes.

While a great many types of screen changers and other small area polymer filters exist, nearly all large-area gel filters have a similar construction. One such filter is disclosed in U.S. Pat. No. 3,727,767 (Itter et al). One of the simplest of the commercialized large area filters of this type uses four simple globe-type valves to direct polymer to and from either one of two filter housings. The housing contains a single candle type filter element, but it is customary for larger size filters to have a cluster of seven or more candles in a larger housing. A similar filter system is manufactured by Fuji Filter Manufacturing Company and uses two three-way valve plugs for directing polymer flow, the filter housings being heated in an oven enclosure. The Itter et al patent talks about installing each filter housing in a casing which must be heated, but the patent does not disclose how the heating is accomplished.

A very popular brand of large area polymer filter system has been sold by the Fluid Dynamics Company (now Memtec). It is similar to the Fuji filter system with oven heating of the candle housings, but the Fluid Dynamics "CPF" filter uses two sliding spool valves instead of rotating valve plugs. One common size for these filters is to have seven candle elements in each housing, each candle being a perforated tube covered by pleated screen wire in two or more layers. Candle filters, per se, are well known and are disclosed, for example, in the filtration system illustrated and described in U.S. Pat. No. 3,833,121 (Singleton et al). One popular candle size is 1.38" O. D. by 16" long and has 1.2 to 1.4 square feet of area, or about 9 square feet (1300 square inches) for seven candles. Such a filter can be used with a polymer flow rate of two hundred to one thousand pounds per hour, or 0.20 to 0.77 pounds per hour per square inch of area. This corresponds to the output of an extruder with a screw diameter of 2.5 to 4.5 inches. Much larger filters are made by Memtec and by PTI Technologies Inc. (a subsidiary of HR Textron Inc.). PTI offers filters with on-stream areas up to three hundred sixty five square feet for very high polymer flow rates. These very large filters usually have large spool valves connected to the candle housings via heated piping.

In most of the prior art candle type polymer filter systems, one of two filter housings is on-stream. The other is cleaned, installed and heated to be ready to accept the polymer when the filter medium in the on-stream housing becomes too dirty for continued operation. To switch housings, the valves are operated simultaneously (or nearly simultaneously) and polymer is introduced to the clean housing while flow continues through the dirty housing. All of the filters have means to vent air from the clean housing and completely fill that housing with polymer. Once the clean housing is filled, the valves are moved to the position for full flow through the clean housing, the dirty housing being shut off at its inlet and outlet so that it can be removed for cleaning. The entire housing and its dirty candles are cleaned at a remote location and then the clean parts are reassembled, installed and heated to be ready to switch back on-line. Once a week is a typical time to change housings, but it could be more or less depending on the amount of gels and any foreign material in the polymer. Pressure drop across the candles is usually from about two hundred psig on clean candles to fifteen hundred psig when the filters are due for changing.

A primary problem with prior art filters is the high initial cost of the units. Another problem is the high polymer residence time in the filter and non-uniform residence time, potentially causing thermal degradation when thermally sensitive polymers are used. With some prior art filters operator error can cause polymer flow to be completely shut off to both housings, stopping flow from the extruder and blowing the safety rupture disc that must always be installed at the exit of any extruder. This terminates the extrusion process and requires replacement of the expensive rupture disc. Another typical problem is the need to clean the candle housing as well as the candles when dirty candles are removed.

SUMMARY OF THE INVENTION

Accordingly, it is a primary object of the present invention to overcome the above-mentioned disadvantages of the prior art by providing a method and apparatus for removing and replacing filters in a housing in a continuous polymer extrusion process.

Another object of the present invention is to provide a method and apparatus allowing filtering of flowable plastic material without interruption for filter replacement or cleaning.

Yet another object of the present invention is to provide a method and apparatus for effecting small micron size filtration over a large area for polymer extrusion processes.

A further object of the present invention is to provide a method and apparatus for filtering flowable polymer without producing large pressure differentials across the filters.

Another object of the present invention is to provide a filter apparatus that reduces and equalizes the residence time of the polymer in the filtration process.

Still another object of the present invention is to provide a continuous process replaceable filter apparatus that operates with a single valve.

An additional object of the present invention is to provide a replaceable filter apparatus that prevents accidental flow interruption.

Another object of the present invention is to prevent accidental removal of filter elements that have not been properly shut off from the pressurized polymer supply and discharge ports.

In accordance with the present invention, a filter housing has a plurality of cavities defined therein, each receiving one or more filter elements supported by a plurality of selectively removable segment plates attached thereto. A single-valved distribution control component, comprising a series of inlet and outlet ports and passages, receives input flowable polymer from a continuous polymer melting system, opens and closes parallel flow paths through selected filters in response to valve rotation, and returns filtered polymer to the system for extrusion.

The arrangement of the valve passages with respect to the segment plates effects simultaneous opening of flow to at least one segment whenever flow is interrupted to at least one other segment, assuring continuous fluid flow through the apparatus. A cover plate moves in tandem with the valve to provide operator access only to off-line segments so that filter elements can be inspected and replaced or cleaned, while simultaneously covering the remaining segments to prevent access to on-line filter segments as a safeguard against inadvertent removal. The cavity opening from which filters are removed longitudinally are contoured to scrape excess polymer from the withdrawn filter. Replacement of removed filter segments by pre-heated clean segments can be accomplished virtually immediately to prevent the scraped polymer from caking in the cavity.

Some of the advantages of the present invention over the prior art are that the single valve design requires no synchronization for optimum performance, and is simple to operate and inexpensive to manufacture, making it economical to machine tapered filter cavities to reduce and regulate the residence time of polymer in the filter assembly. The use of multiple filter elements or segments reduces the pressure fluctuation during filter exchanges in turn assuring smooth flow.

The operator can customize a filter replacement schedule to optimize polymer flow for residence time or exit pressure uniformity as required. The parallel alignment of the filters and valve and the inlet and outlet port locations near each other on the housing side result in a compact design mountable perpendicular to the extruder saving both space and weight. The unit can be heated by band or cartridge heaters avoiding the need for bulky and costly uniform temperature ovens.

Other objects and advantages of the present invention will become apparent from the following description of the preferred embodiments taken in conjunction with the accompanying drawings wherein like parts in the different figures are identified by the same reference numbers.

DESCRIPTION OF THE PREFERRED EMBODIMENT

Figure 1:
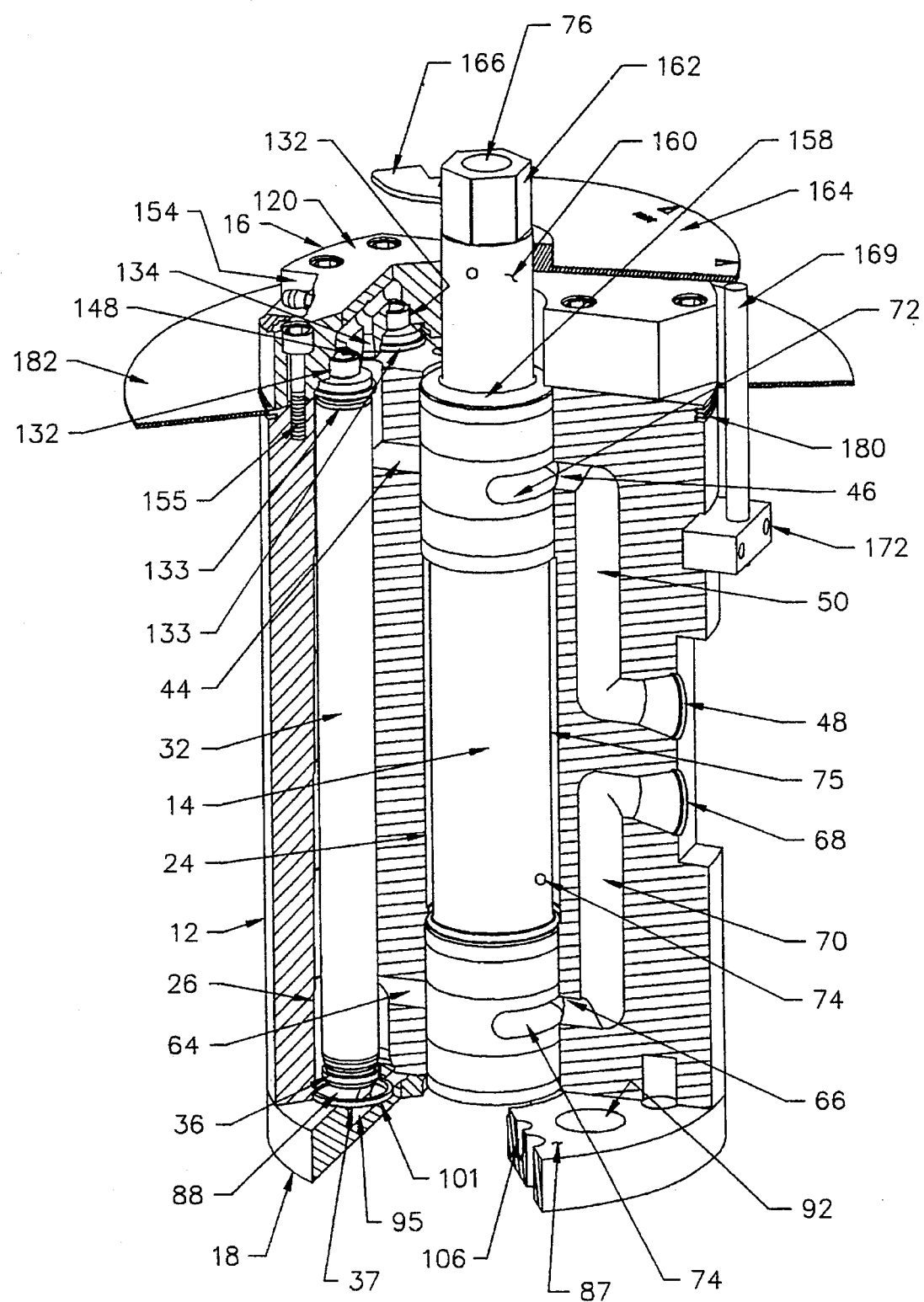
FIG. 1 is a perspective view in partial section of a large area polymer filter assembly according to the present invention.
Figure 2:
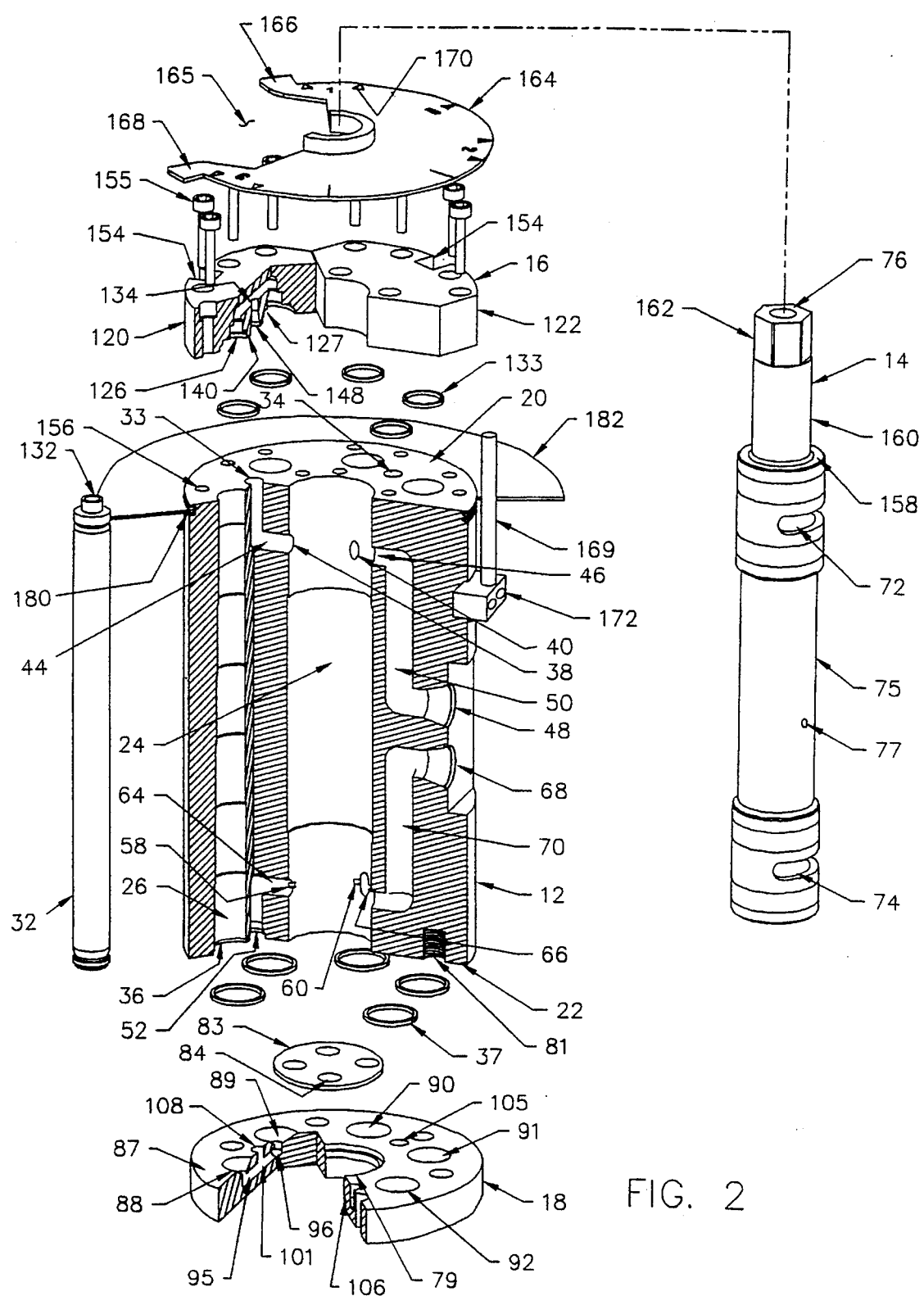
FIG. 2 is an exploded perspective view in partial section of the assembly of FIG. 1.
Figure 3:
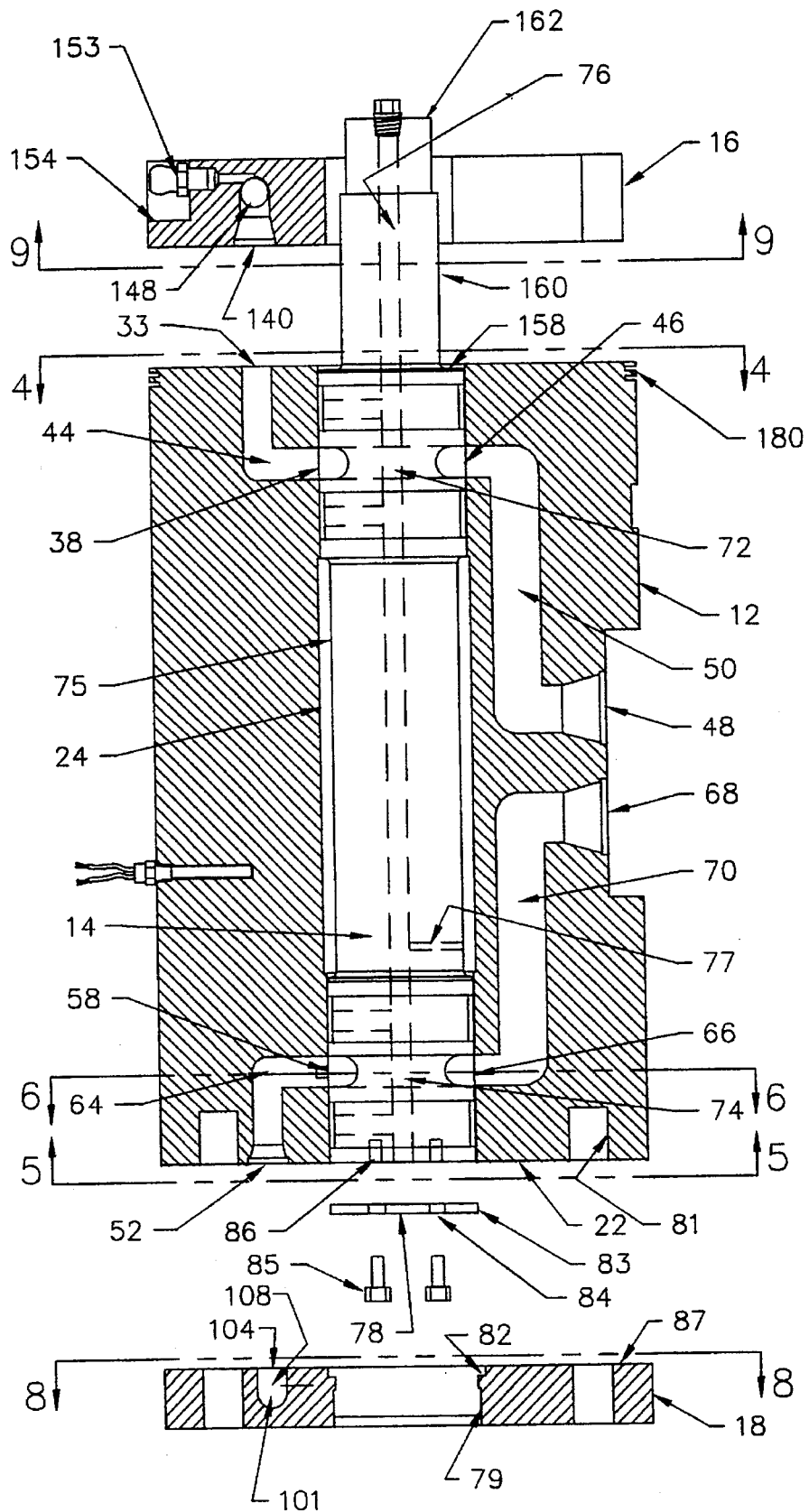
FIG. 3 is a partially exploded view in longitudinal section of the assembly of FIG. 1 taken along a diametric plane of the filter housing and the centers of the input and output ports.
Figure 4:
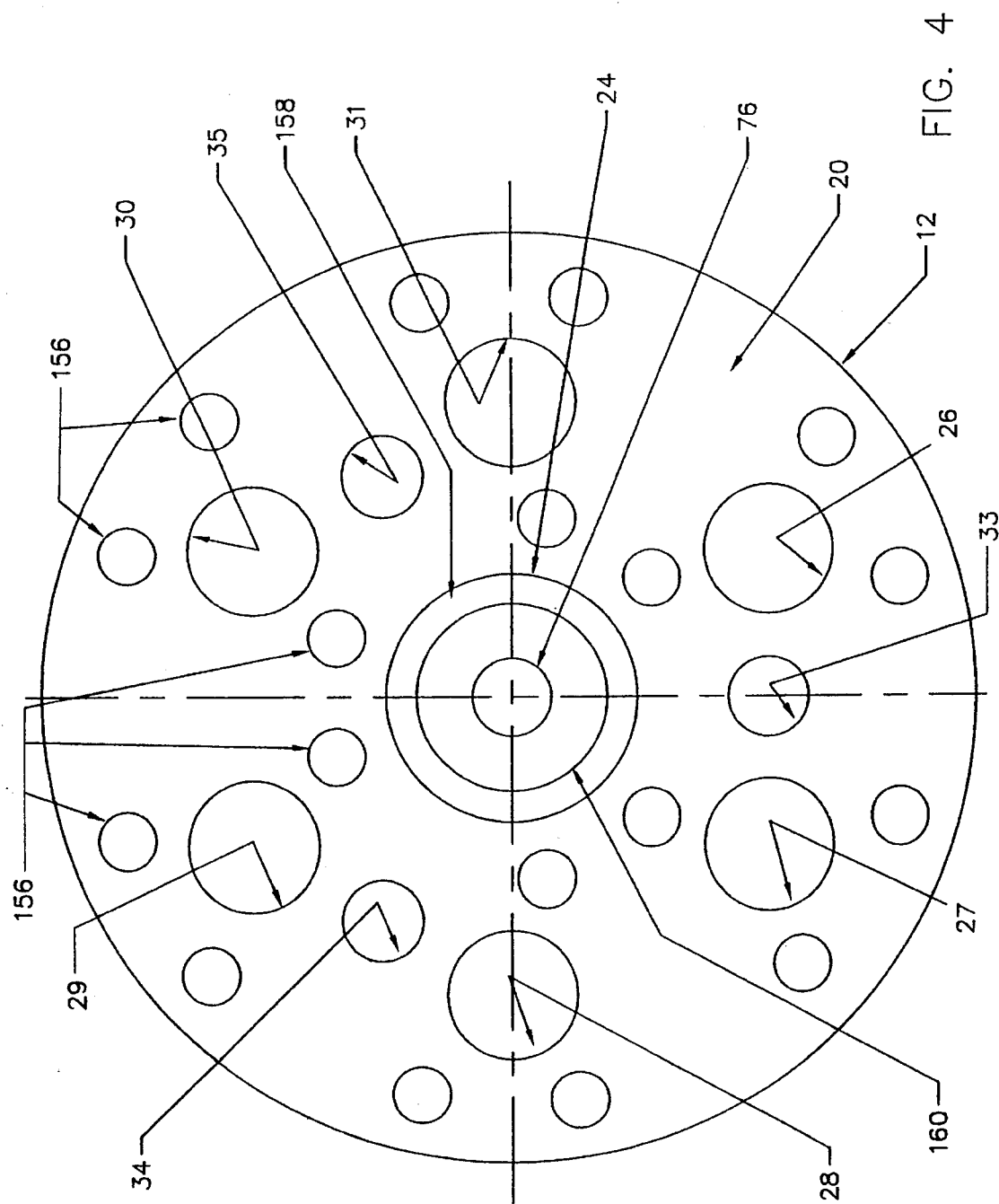
FIG. 4 is a plan view taken along line 4—4 of FIG. 3.

The large area polymer filter 10 of the present invention shown in FIGS. 1 through 20 comprises a cylindrical filter housing 12, a valve plug 14, an upper flange assembly 16 and a lower flange 18. To facilitate and simplify understanding of the following description, the orientation of the present embodiment will be consistently illustrated with the axis of the cylindrical filter housing oriented vertically with upper and lower ends 20 and 22, respectively, and upper flange assembly 16 and lower flange 18 attached respectively thereto. With regard to flow through the filter, the upper end 20 and upper flange assembly 16 are associated with output, and the lower end 22 and lower flange 18 are associated with input.

Filter housing 12 is cylindrical and has upper and lower ends 20 and 22, respectively. A centerline borehole 24 extending longitudinally through housing 12 is sized to tightly but rotatably accept valve plug 14. Six upwardly tapered filter cavities 26, 27, 28, 29, 30 and 31, radially positioned and evenly spaced about and parallel to borehole 24, also extend through housing 12. The cavities are sized to receive at least one standard cylindrical candle-type pleated wire filter 32, for instance, Model 116150-100-1 manufactured by MEMTEC (Deland, Fla.), in a snug fit at the output or upper end of housing 12 and a less tight fit at the lower or input end, resulting in a decreasing annular volume between the filter and the cavity wall in the input to output direction. Lower end 22 has countersunk recesses 36 centered on filter cavities 26-31 sized to receive seals 37. Output orifices 33, 34 and 35 are defined in upper end 20 of housing 12 between paired filter cavities, 26 and 27, 28 and 29, and 30 and 31, respectively, shown in FIG. 4 and communicate via respective passages 44 with evenly spaced borehole output orifices 38, 40 and 42, respectively, defined at circumferentially spaced locations in the borehole wall near the upper end of borehole 24. Output orifice 46, located diametrically opposite borehole output orifice 38, between orifices 40 and 42, communicates via output passageway 50 with an output port 48 defined in the outer surface of housing 12.

Figure 5:
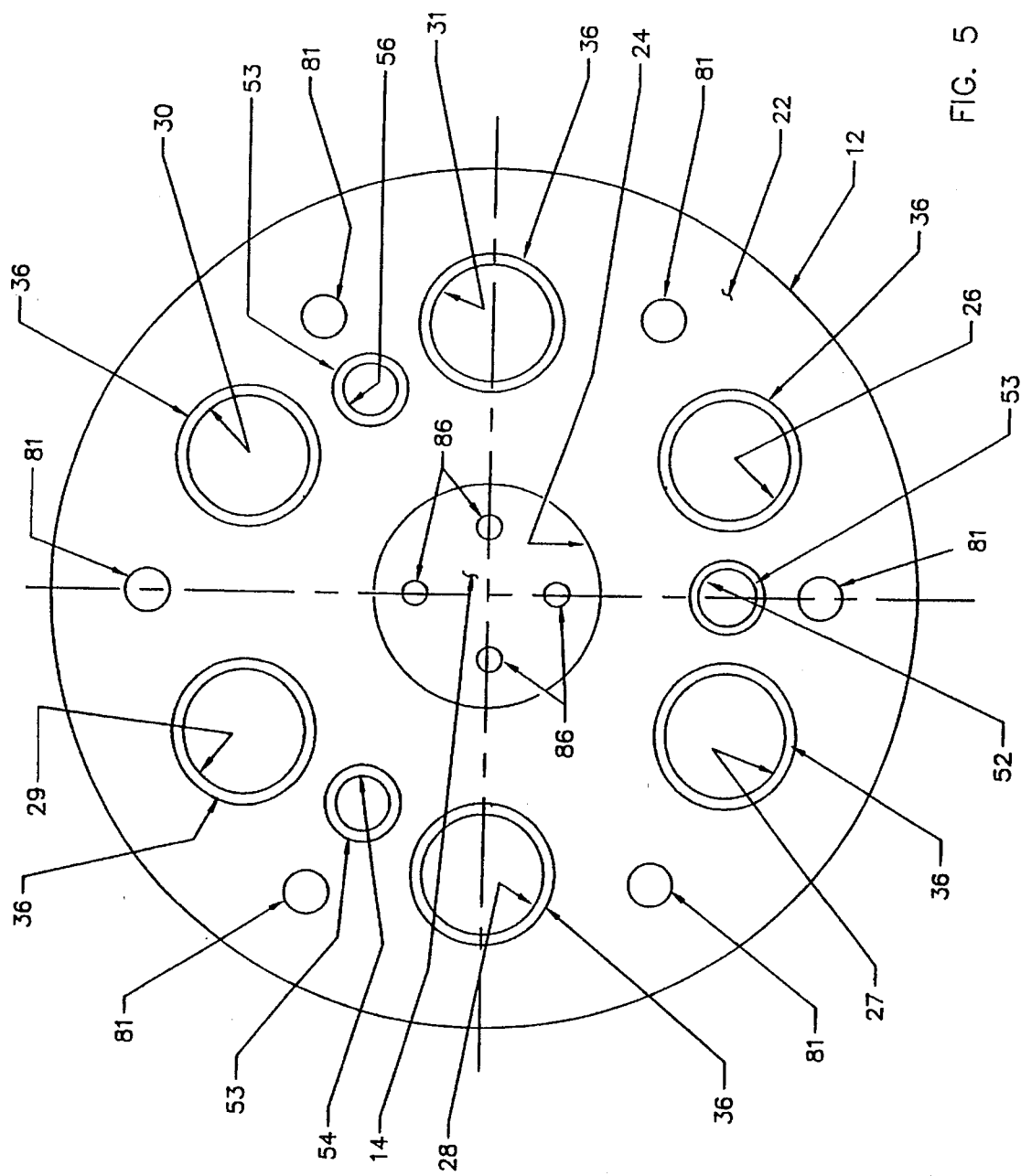
FIG. 5 is a plan view taken along line 5—5 of FIG. 3.
Figure 6:
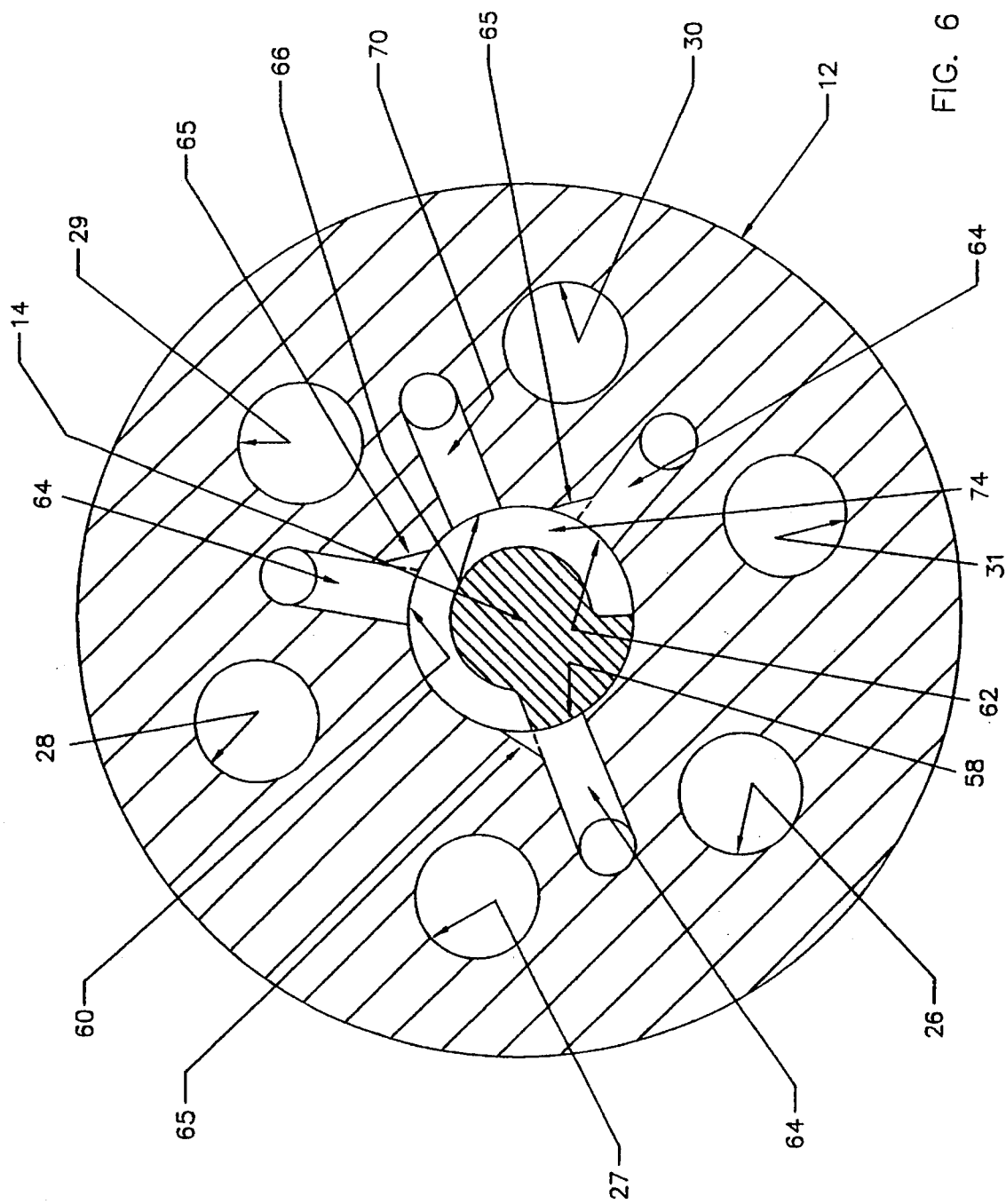
FIG. 6 is a plan view taken along line 6—6 of FIG. 3.
Figure 7:
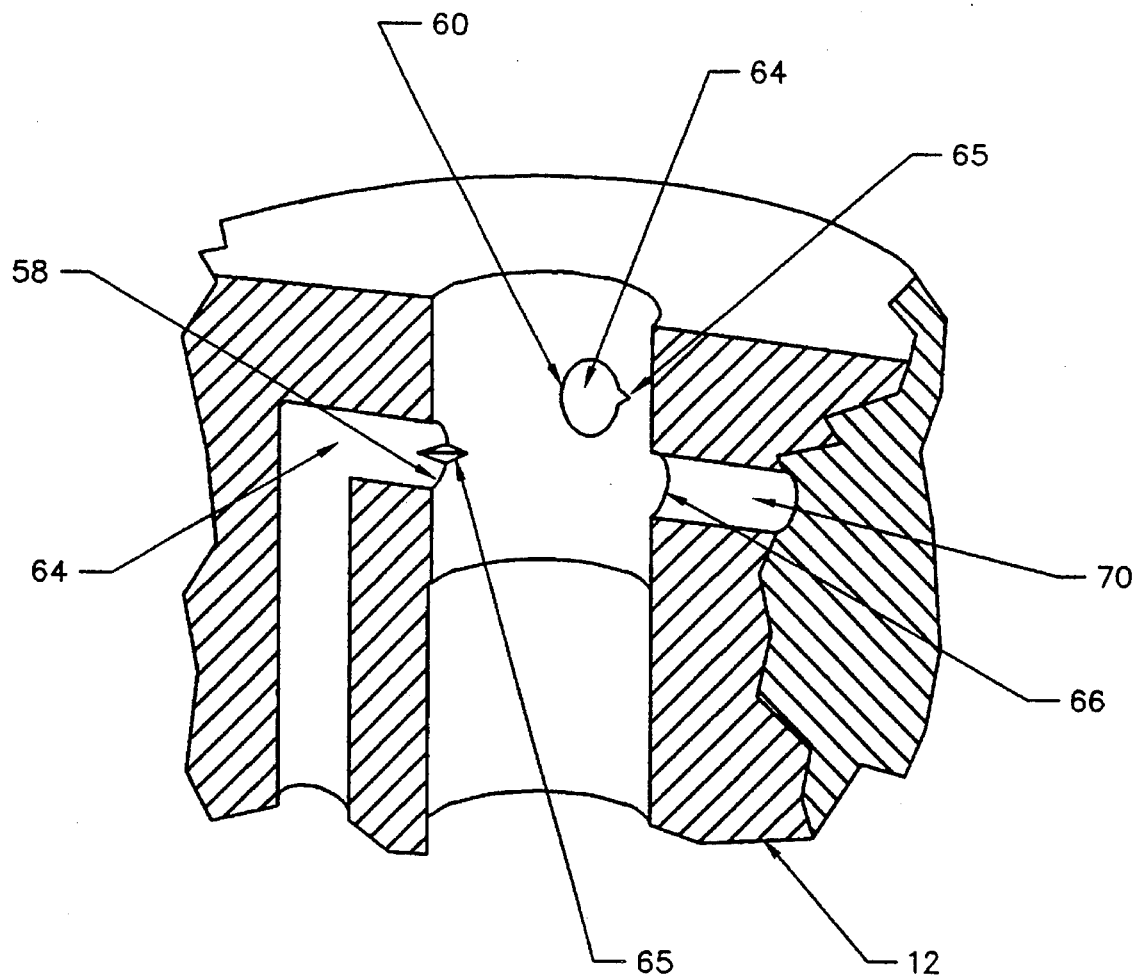
FIG. 7 is a perspective view in partial section of the bleed notch on a borehole input orifice.

Similarly, input orifices 52, 54 and 56 with countersunk recesses 53 are defined in lower end 22 of housing 12 between filter paired cavities 26 and 27, 28 and 29, and 30 and 31, respectively, shown in FIG. 5 and communicate via respective passages 64 with evenly spaced input orifices 58, 60 and 62, respectively, defined at circumferentially spaced locations in the borehole wall near the lower end of borehole 24. Passages 64 have bleed notches 65, shown in FIGS. 6 and 7, on one side along respective segments of input orifices 58, 60 and 62. Notches 65, or short extensions of orifices 58, 60 and 62, extend the orifice cross-sectional area laterally a small amount in the plane of groove 74 and extend a short penetration depth into housing 12 to produce a bleed passage for trickle flow from input groove 74 into passages 64. Input orifice 66 located diametrically opposite borehole input orifice 58, between orifices 60 and 62, communicates via input passageway 70 with input port 68 aligned with output port 48 defined in the outer surface of housing 12.

Valve plug 14 is cylindrical, coaxially located and rotatably mounted within housing 12, and has upper and lower partially circumferentially arcuate grooves, 72 and 74, respectively, defined therein at longitudinally spaced locations aligned with orifice group 38, 40, 42 and 46 and orifice group 58, 60, 62 and 66, respectively. A tapered plug valve of conventional design could alternatively replace the cylindrical plug valve. Grooves 72 and 74 each have a cross-sectional configuration similar to that of passageways 50 and 70 and extend 240° around valve plug 14 in longitudinal alignment with each other, leaving a 120° arc ungrooved. Valve plug 14 extends beyond upper end 20 of housing 12 into and through a suitably provided central bore in upper flange assembly 16, and is substantially flush with lower end 22 of housing 12. Valve plug 14 is machined to a slightly smaller diameter along an intermediate length portion 75 extending from a location below upper groove 72 to a location above lower groove 74. The annular volume between portion 75 and borehole 24 provides a reservoir for leakage around valve plug 14. A borehole 76 extends concentrically and downwardly through the length of valve plug 14 and communicates with the aforesaid leakage reservoir through a small radial release passage 77 defined in valve plug 14 at a longitudinal position near the lower end of portion 75. Passage 77 serves to release liquid polymer entrapped in the reservoir.

Lower flange 18 is an annular plate having an outer diameter similar to that of lower end 22 of housing 12. A central borehole 79, slightly larger in diameter than valve plug 14, is defined through plate 18. Plate 18 is attached to the bottom of housing 12 by means of a plurality of bolts 80 extending through suitable holes in the plate into threaded holes 81 in the housing. On the upper or interior surface 87 of plate 18 there is defined an annular recess or countersink 82 concentrically surrounding and slightly larger in diameter than borehole 79. An annular plate 83, slightly larger in diameter than the bottom of valve plug 14 but smaller than countersink 82, has four holes 84 sized for bolts 85 (shown in FIG. 3 and FIG. 11 but omitted in the other figures to preserve clarity) received into threaded holes 86 in the lower end of valve plug 14 and a central circular opening 78 aligned with valve plug borehole 76. Plate 83 prevents plug 14 from displacing vertically. On the upper or surface 87 of plate 18, downwardly tapered countersunk recesses 88 through 93 are sized smaller than and aligned with the inside of metal seals 37 in the countersunk recesses 36 in the entrance ends of candle filters 32 housed in cavities 26 through 31 respectively. Passages 95 through 100 extend downward from recesses 88 through 93, respectively, part way into plate 18. Passages 95 and 96 are interconnected by transverse cross-passage 101, and similar cross-passages 102 and 103 interconnect passage pairs 97, 98 and 99, 100, respectively, within plate 18.

Figure 8:
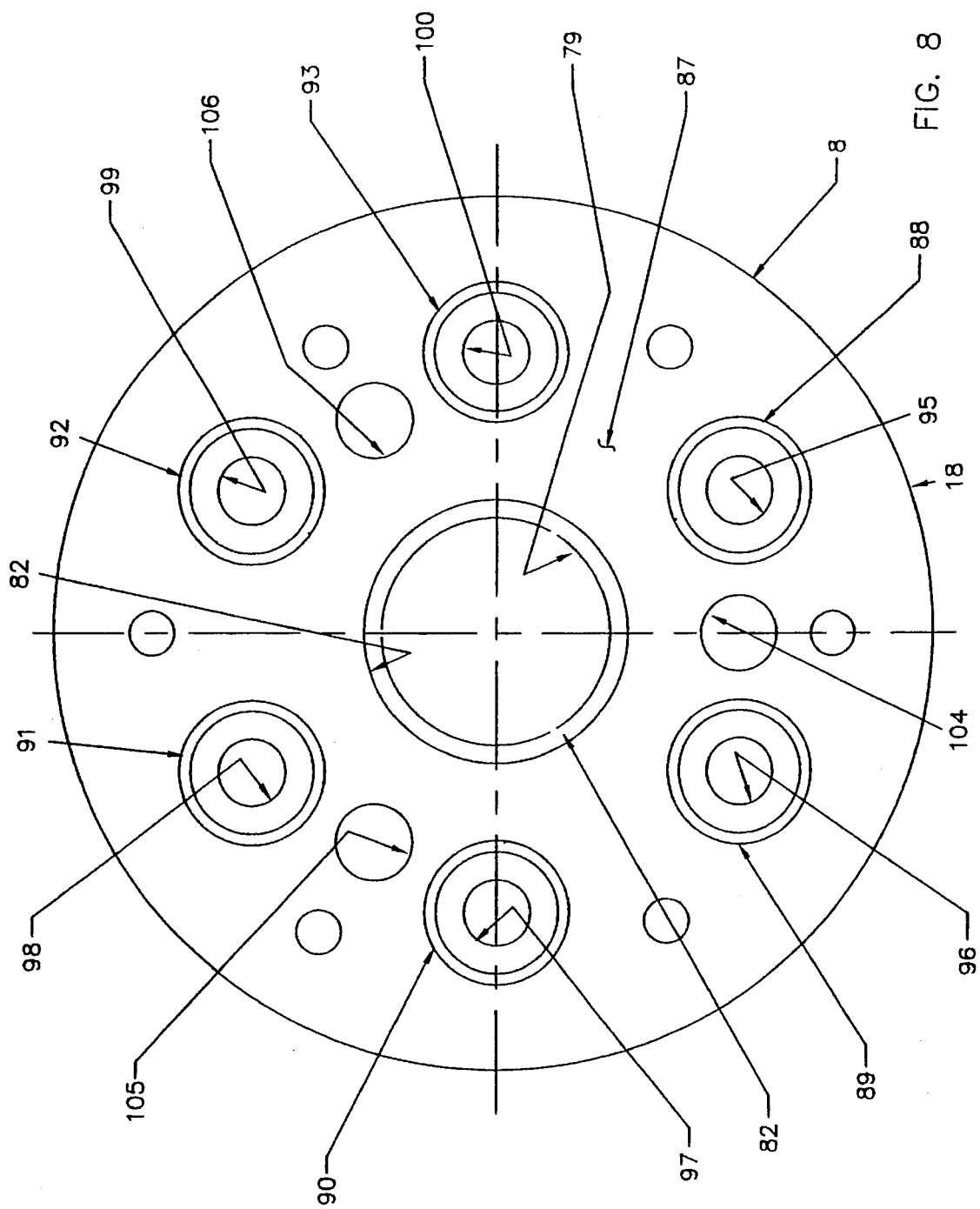
FIG. 8 is a plan view taken along line 8—8 of FIG. 3.

Orifices 104, 105 and 106 on upper surface 87 of plate 18 shown in FIG. 8 are aligned with end input orifices 52, 54 and 56, respectively and communicate via passages 108, 110 and 112, respectively, with cross-passages 101, 102 and 103, respectively.

Figure 9:
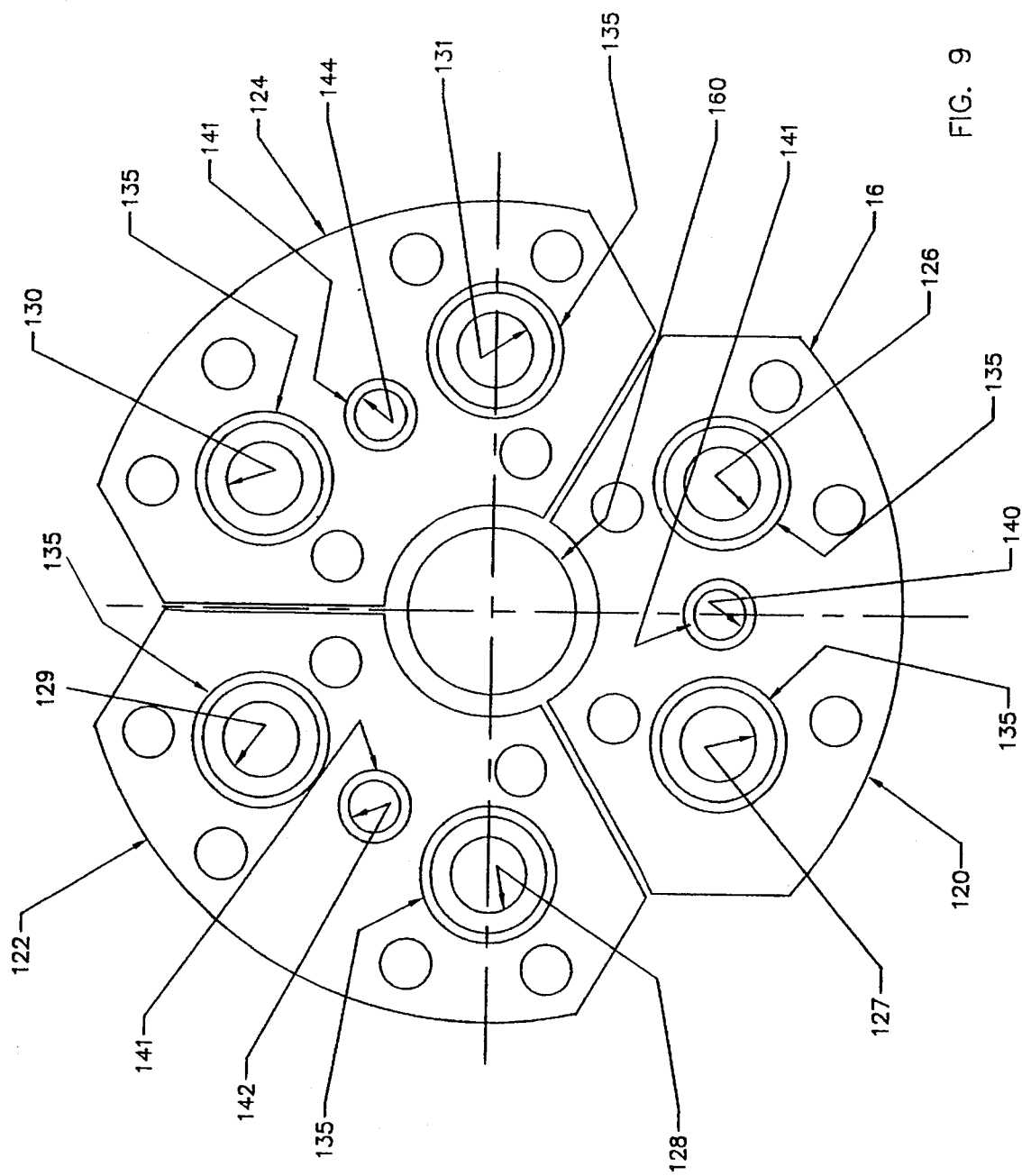
FIG. 9 is a plan view taken along line 9—9 of FIG. 3.
Figure 10:
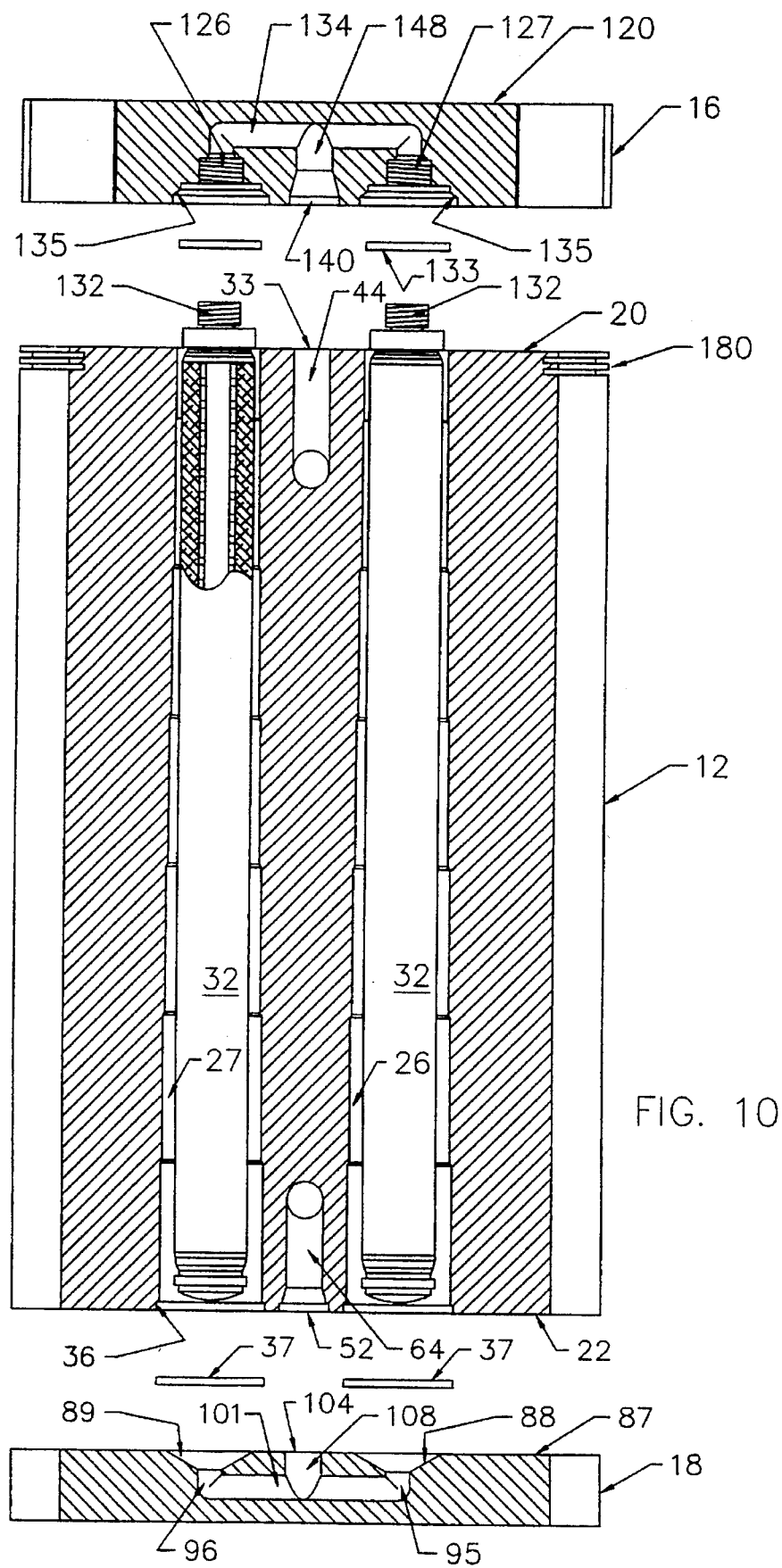
FIG. 10 is a partially exploded view in longitudinal section of the assembly of FIG. 1 taken along a plane through the centerlines of two of the assembly filter cavities.
Figure 11:
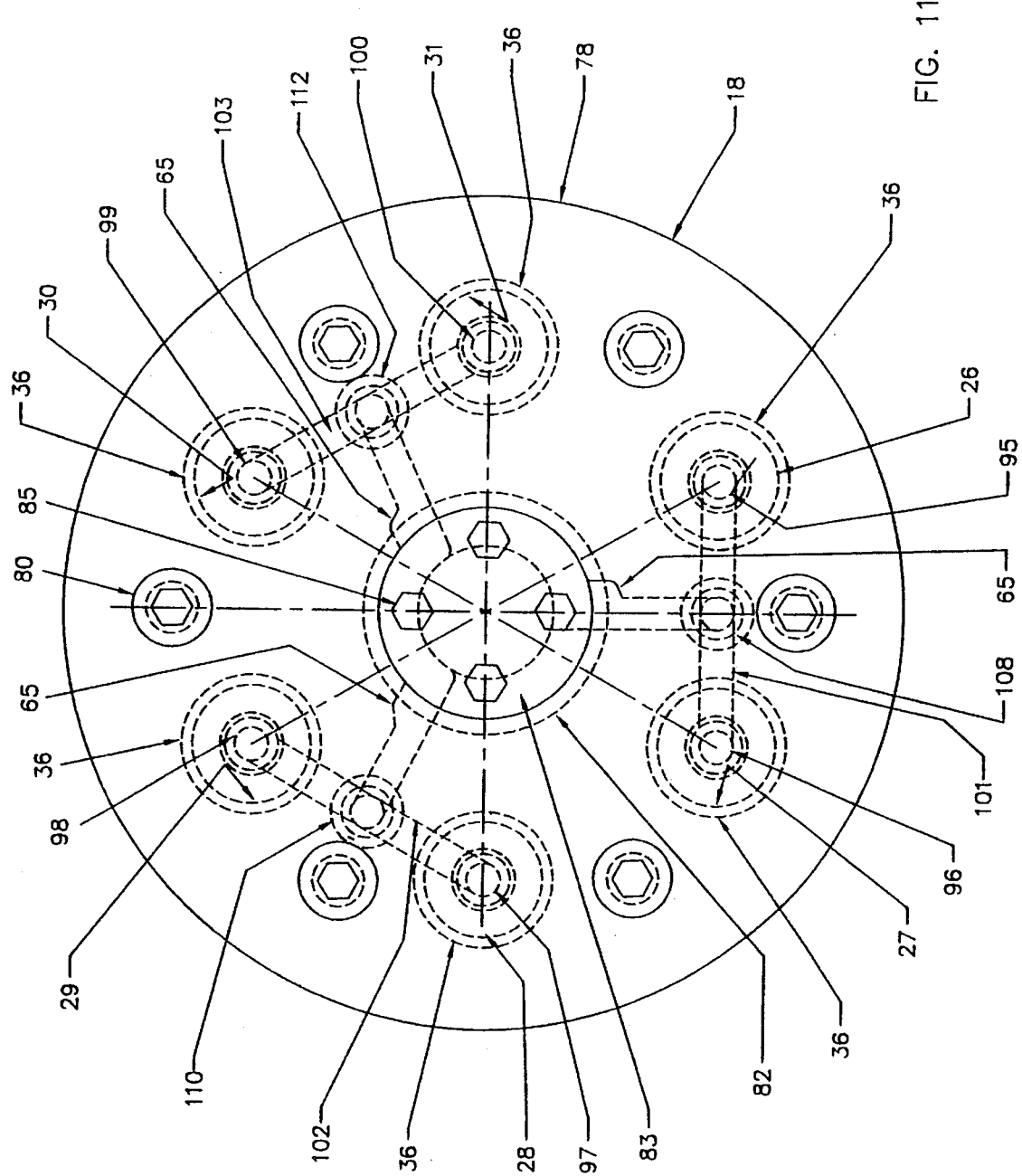
FIG. 11 is a bottom view in plan of the lower flange of the assembly of FIG. 1.
Figure 12:
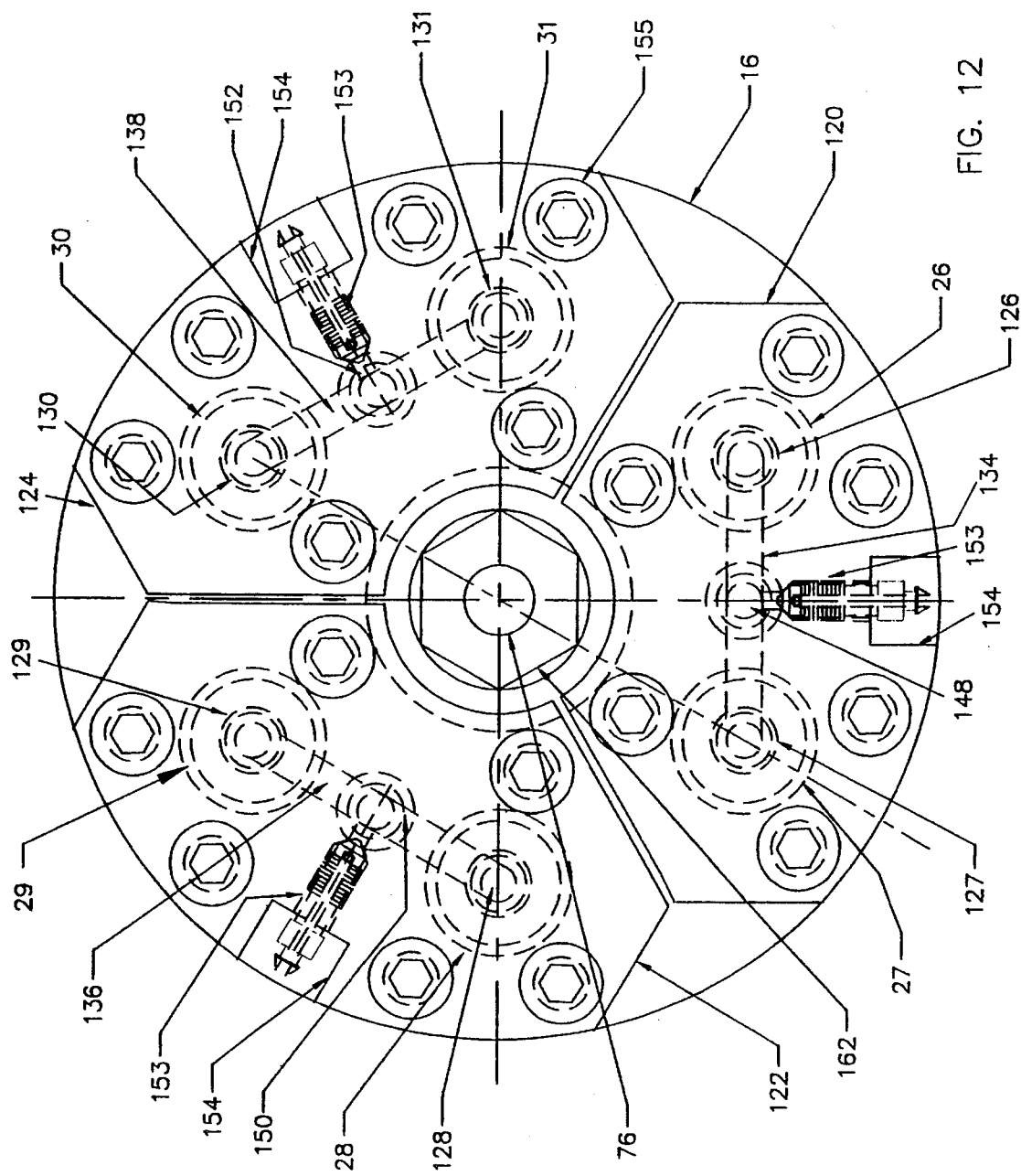
FIG. 12 is a top view in plan of the upper flange assembly of the assembly of FIG. 1.

Upper flange assembly 16, shown in FIG. 9, is an annular assembly made up of three arcuate segment plates 120, 122 and 124, each circumscribing an arc of slightly less than 120°. The segment plates each have an outer radius similar to the radius of upper end 20 of housing 12 and an inner radius slightly smaller than the radius of valve plug 14. The outer corners defined by the outer arcuate surface and the radial sides of segment plates 120, 122 and 124 are beveled to permit easy access as described below. Passages 126 and 127 are aligned with filter cavities 26 and 27, respectively, and extend longitudinally from the bottom surfaces of plate 120 partially into the plate. Passages 128 and 129 in plate 122 are similarly aligned with filter cavities 28 and 29, respectively; and passages 130 and 131 in plate 124 are similarly aligned with filter cavities 30 and 31, respectively. Passages 126 through 131 are threaded to receive threaded exit ends 132 of candle filters 32. Metal seals 133 fit around exit ends 132 between plates 120, 122, 124 and housing 12 in countersunk recesses 135 in plates 120, 122 and 124. Paired passages 126 and 127 are connected by a transverse cross-passage 134 within plate 120; similarly cross-passages 136 and 138 connect passages pair 128, 129 and pair 130, 131, respectively. Orifices 140, 142 and 146 having countersunk recesses 141 are defined in the lower or interior end surfaces of respective segment plates 120, 122 and 124, shown in FIG. 9 in alignment with respective end output orifices 33, 34 and 35 to communicate via passages 148, 150 and 152, respectively, with respective cross-passages 134, 136 and 138. Bleed valves 153 of conventional design, mounted in notches 154 cut radially inward from the outer edges of respective plates 120, 122 and 124 shown in FIGS. 3 and 12, communicate with respective cross-passages 134, 136 and 138. Segment plates 120, 122 and 124 are attached to the housing upper end 20 by a plurality of bolts 155 extending through suitably provided through holes in the segment plates and into threaded holes 156 in the upper end of housing 12.

Figure 13:
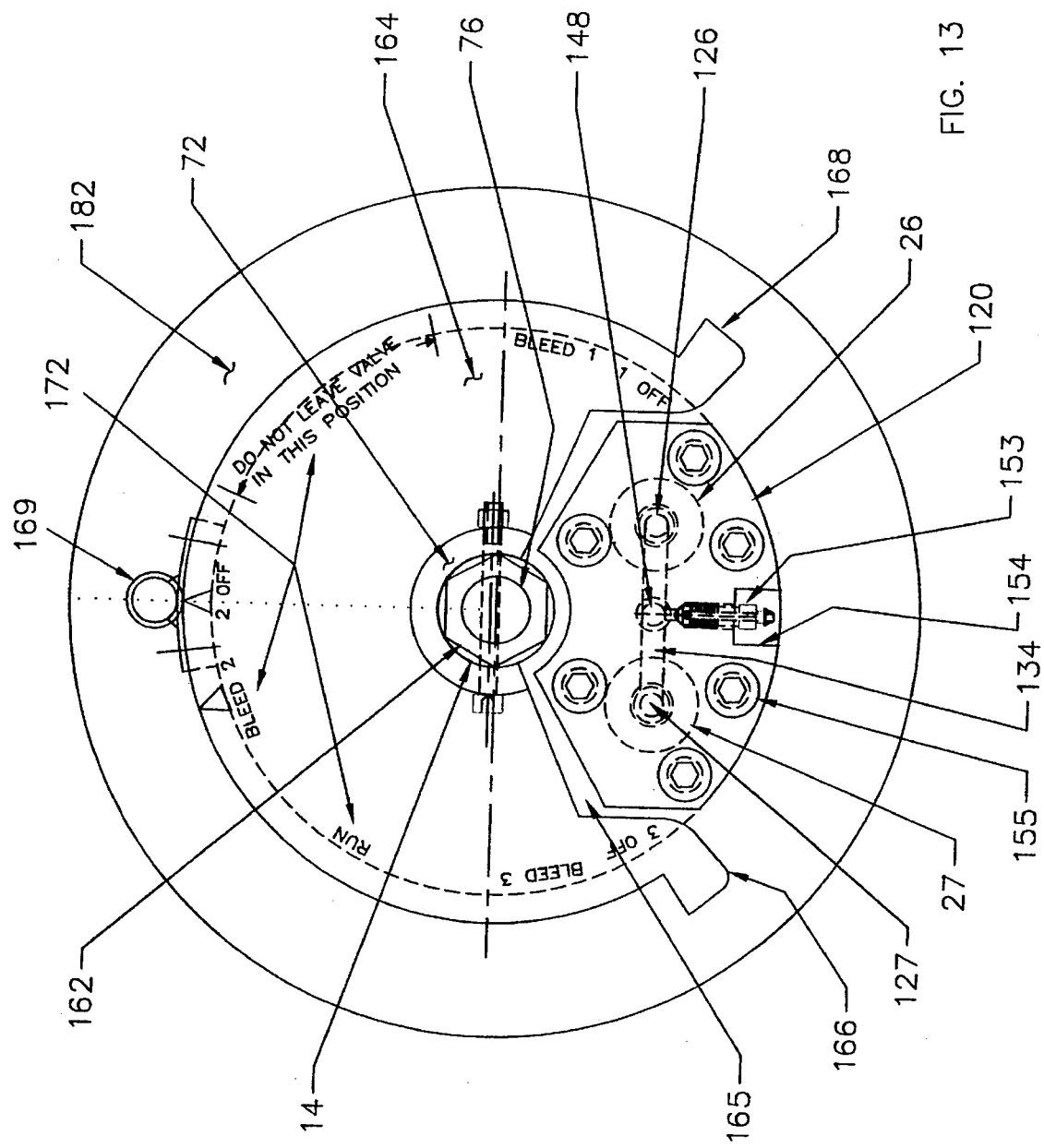
FIG. 13 is a top view in plan of the assembly of FIG. 1.

Shoulder 158 is recessed below surface 20 to prevent contact with segment plates 120, 122 and 124. A neck 160 of valve plug 14 extends upward from shoulder 158 beyond segment plates 120, 122 and 124 and terminates in a hex head 162. Attached to valve plug neck 160 between plates 120, 122 and 124 and hex head 162 and perpendicular to the axis of valve plug 14 is a flat indicator plate 164, shown most clearly in FIG. 13, of generally annular shape having a diameter approximately equal to that of housing 12 with an open segment or cutaway 165 slightly larger than 120° and extensions 166 and 168 projecting radially outward from opposite ends of the open segment. Indicator plate 164 is fixedly attached at its central opening to valve plug 14 with the angular center of open segment 165 aligned radially opposite the angular center of 240° circumferential grooves 72 and 74. Thus the open segment 165 is centrally aligned, in an angular sense, with the non-grooved or passage-blocking segments of the valve plug. A stop pin 169 is attached alongside housing 12 by mount 172 to extend parallel to and outboard of housing 12. Pin 169 is angularly aligned with input and output ports 68 and 48 respectively, and extends longitudinally slightly beyond segment plates 120, 122 and 124 and indicator plate 164. The stop pin is positioned outside the periphery of indicator plate 164 but within the radial extent of radial extensions 166 and 168. FIG. 13 shows valve plug 14 and attached indicator plate 164 oriented relative to housing 12 with the angular center of groove 72 and groove 74 (not shown) radially aligned with input and output ports 68 and 48 (not shown), respectively, and stop pin 169. Using a line extending from the central longitudinal axis of the housing radially outward through stop pin 169 as a 0° reference, and with clockwise considered positive and counterclockwise negative, markings 172 are located around the peripheral edge of indicator plate 164 as follows: "2 OFF" at 0°; "BLEED 2" at minus 20°, "RUN" at minus 60°; "BLEED 3" at minus 100°; "3 OFF" at minus 120°; "BLEED 1" at plus 100°; and "1OFF" at plus 120°, where "1", "2" and "3" refer to annular segments 124, 120 and 122, respectively, and their correspondingly aligned filter cavity pairs, 30 and 31, 26 and 27, and 28 and 29, respectively. Open arcuate segment 165 extends from approximately plus 115° to approximately minus 115° to define an open 130° segment. The sides of open segment 165 extend radially about two-thirds of the radius of indicator plate 164, then angle toward points located at about plus 133° on the periphery of the indicator plate and then extend radially a short distance as the angularly facing edges of extensions 166 and 168, respectively, each having a width equal to about a 10° arc. The angled portions of open segment 165 correspond to the beveled corners of segment plates 120, 122 and 124, providing open segment 165 with a shape and area corresponding to a slightly oversized segment plate. This allows segment plates 120, 122 and 124 to be accessed and removed through open segment 165 when the segment plate and open segment are aligned.

One or more annular grooves 180 machined circumferentially around the upper exterior portion of housing 12 are dimensioned to detachably receive one or more semi-rigid annular splash plates 182.

The large area polymer filter illustrated in FIGS. 1 through 13 is assembled by inserting seals 133 into recesses 135 where the fit is snug enough to retain the seals. Then, six conventional candle-type pleated wire filters 32 are screwed into threaded passages 126 through 131 formed in the lower or inner surfaces of segment plates 120, 122 and 124. The segment plates are bolted to the upper end 20 of housing 12 with now rigidly attached candle filters 32 extending into but not quite to the ends of filter cavities 26 through 31. The lower ends of the filters are unsupported in their bores. Valve plug 14 is inserted into bore 24. Washer plate 83 is inserted into countersunk recess 82, plate 18 is bolted to the lower end 22 of housing 12 and circular plate 83 is bolted to the lower end of valve plug 14 to secure valve plug 14 fixed longitudinally yet still rotatable. Stop pin 169 is attached to housing 12 aligned angularly with the input and output ports 68 and 48, respectively, and indicator plate 164 is rigidly secured to the neck 160 of valve plug 14 with the "2OFF" inscription angularly aligned with input and output orifices 66 and 46, respectively, to align the open arcuate section 165 with filter segment 120 and prevent access to on-line segments. Fittings are attached to introduce unfiltered molten polymer into the assembly through input port 68 and to return filtered molten polymer to downstream external extrusion processing equipment through a common output port 48. Housing 12 can be heated by conventional means, for instance band heaters, and the assembly can be encased in suitable insulation. Splash plates 182 can be optionally attached to annular groove 180 to protect insulation and heating elements from dripping polymer released during filter changing activity.

In use, molten polymer enters housing 12 through input port 68 and flows through passage 70 to input orifice 66. Flow passes through orifice 66 into 270° (i.e., three-quarter circumferential) lower or input groove 74 in valve plug 14 and hence in parallel through orifices 58, 60 and 62 into respective radial input passages 64 in housing 12 leading, through angularly spaced orifices 52, 54 and 56 at the bottom 22 of housing 12, through orifices 104, 105 and 106 at the upper surface 87 of plate 18 and through passages 108, 110 and 112 in plate 18 to cross-passages 101, 102 and 103, respectively. Flow is directed in parallel through these cross-passages, through passages 95 through 100, into countersunk recesses 88 through 93 and axially into filter cavities 26 through 31 around candle filters 32 respectively. The polymer flows around the closed entrance end of pleated wire candle filters 32 into the tapering annular gaps between the filters and the cavities, then through the filter material along the length of the filters and into the central channel of the filter, leaving any particles of larger size than the filter grid spacing outside the channel. The annular gap between the tapering sides of filter cavities 26 through 31 and cylindrical filters 32 decreases as the unfiltered polymer flows from the input toward the output ends, 22 and 20, respectively, of housing 12 to minimize the volume of stagnantly entrapped polymer, to reduce average residence time and to reduce residence time variation along the length of the filter.

The filtered polymer flows out through exit ends 132 of candle filters 32 into passages 126 through 131, two each in each annular segment plate 120, 122 and 124, respectively, of upper flange assembly 16. The flow proceeds into cross-passages 134, 136 and 138 in the segment plates, through passages 148, 150 and 152 to segment plate orifices 140, 142 and 146, into housing orifices 33, 34 and 35. Back in the housing the polymer flows into radial passages 44 to orifices 38, 40 and 42, into the 270° output groove 72 in valve plug 14 and out through orifice 46 and output passage 50. The polymer passes to the extrusion processing equipment through output port 48 in a filtered condition. It will be appreciated that the polymer flows through all of the active filters, as selected by the common valve, in parallel.

Figure 14:
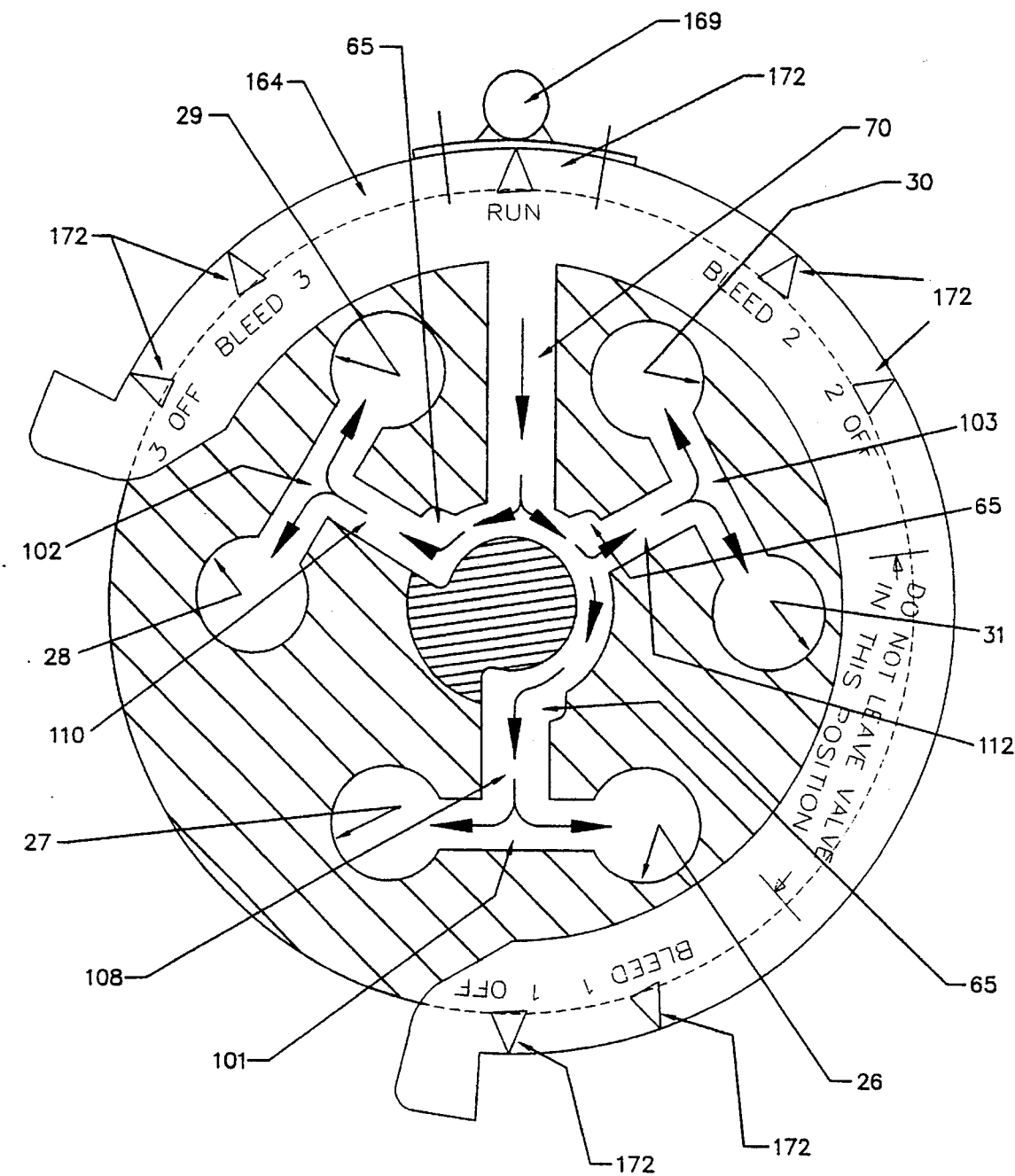
FIG. 14 is a diagram of polymer flow into the six filter cavities of the assembly of FIG. 1.
Figure 15:
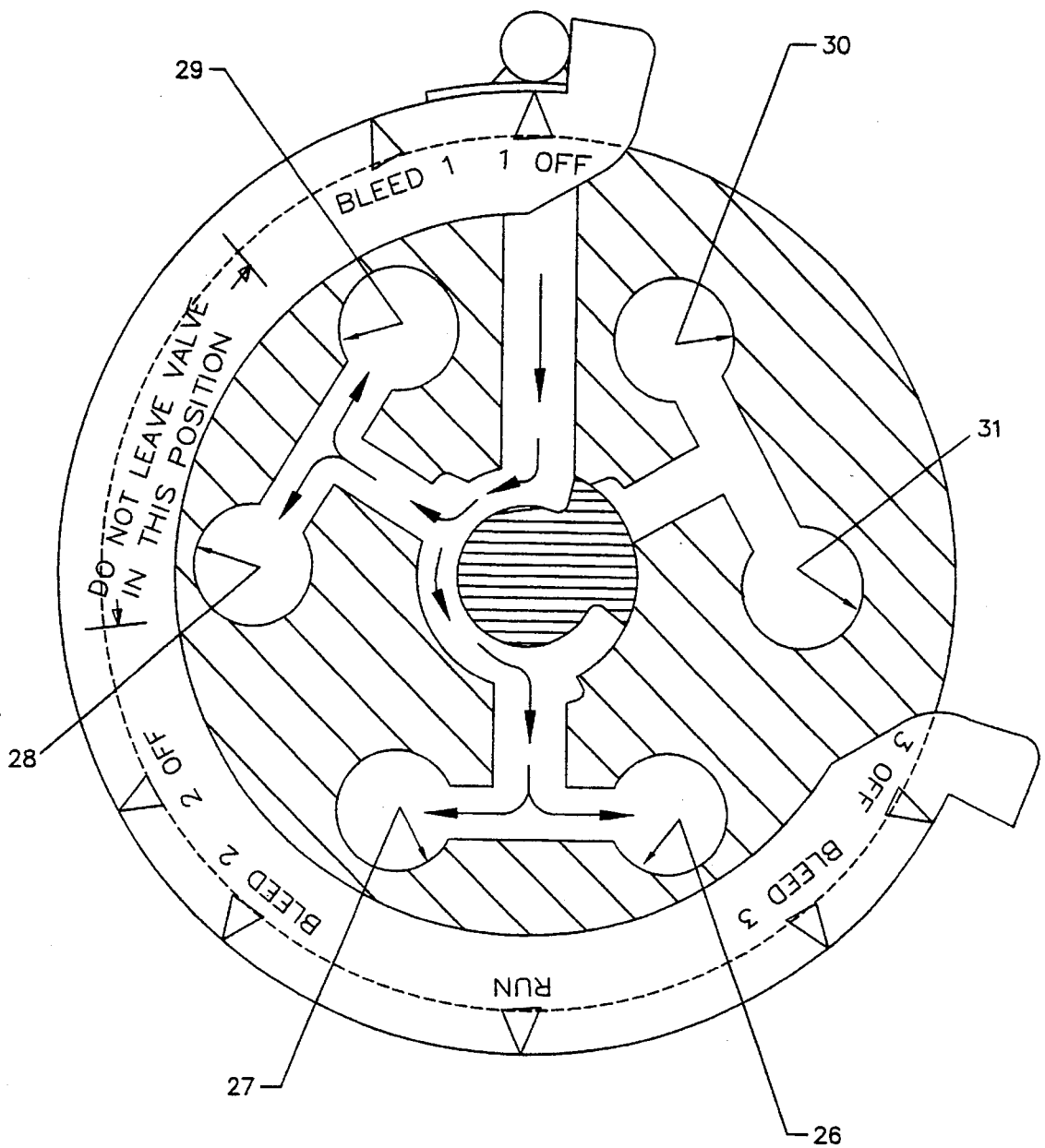
FIG. 15 is a diagram of polymer flow when a first pair of filters is shut off.
Figure 16:
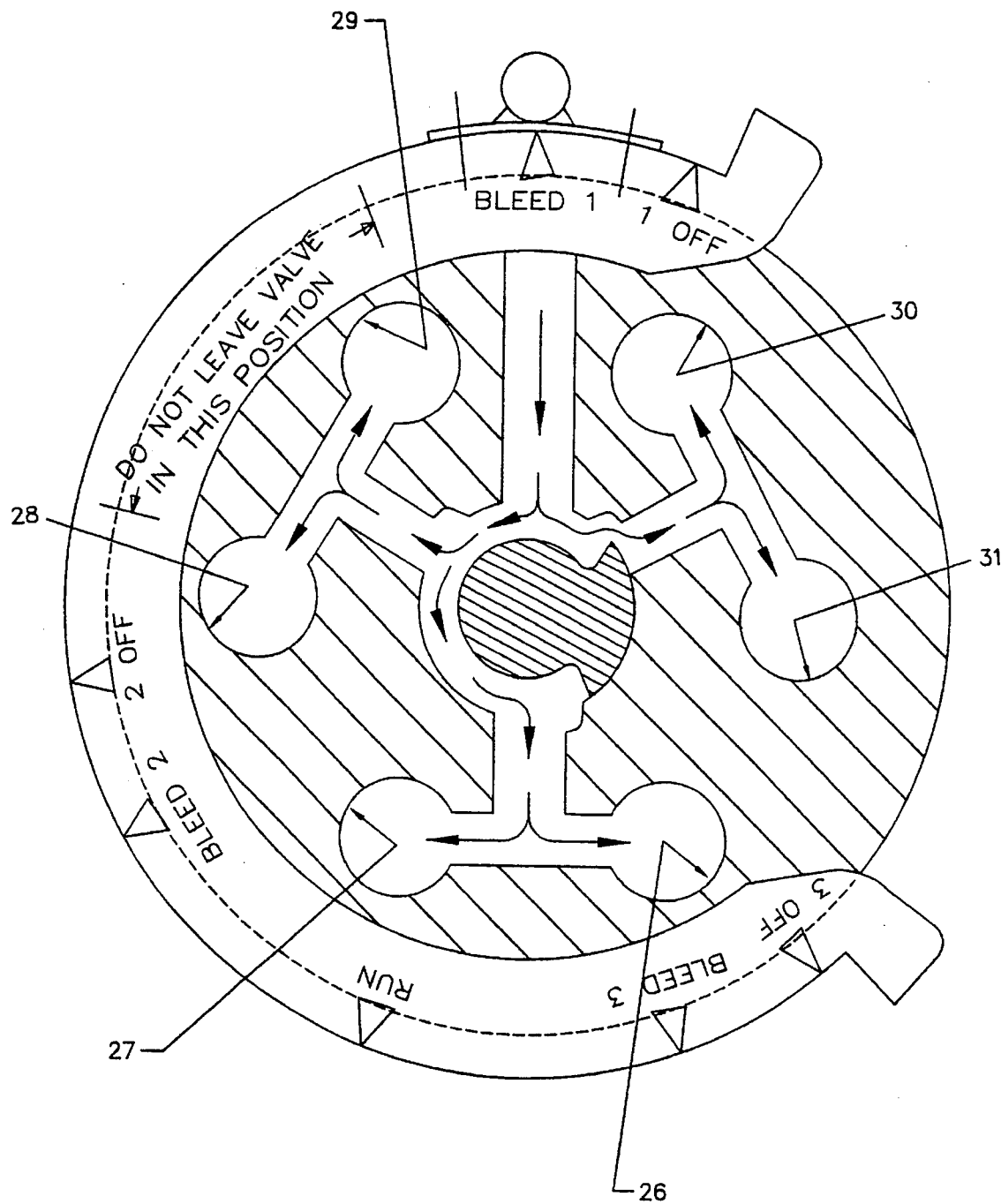
FIG. 16 is a diagram of polymer flow when the first pair of filters is being bled.
Figure 17:
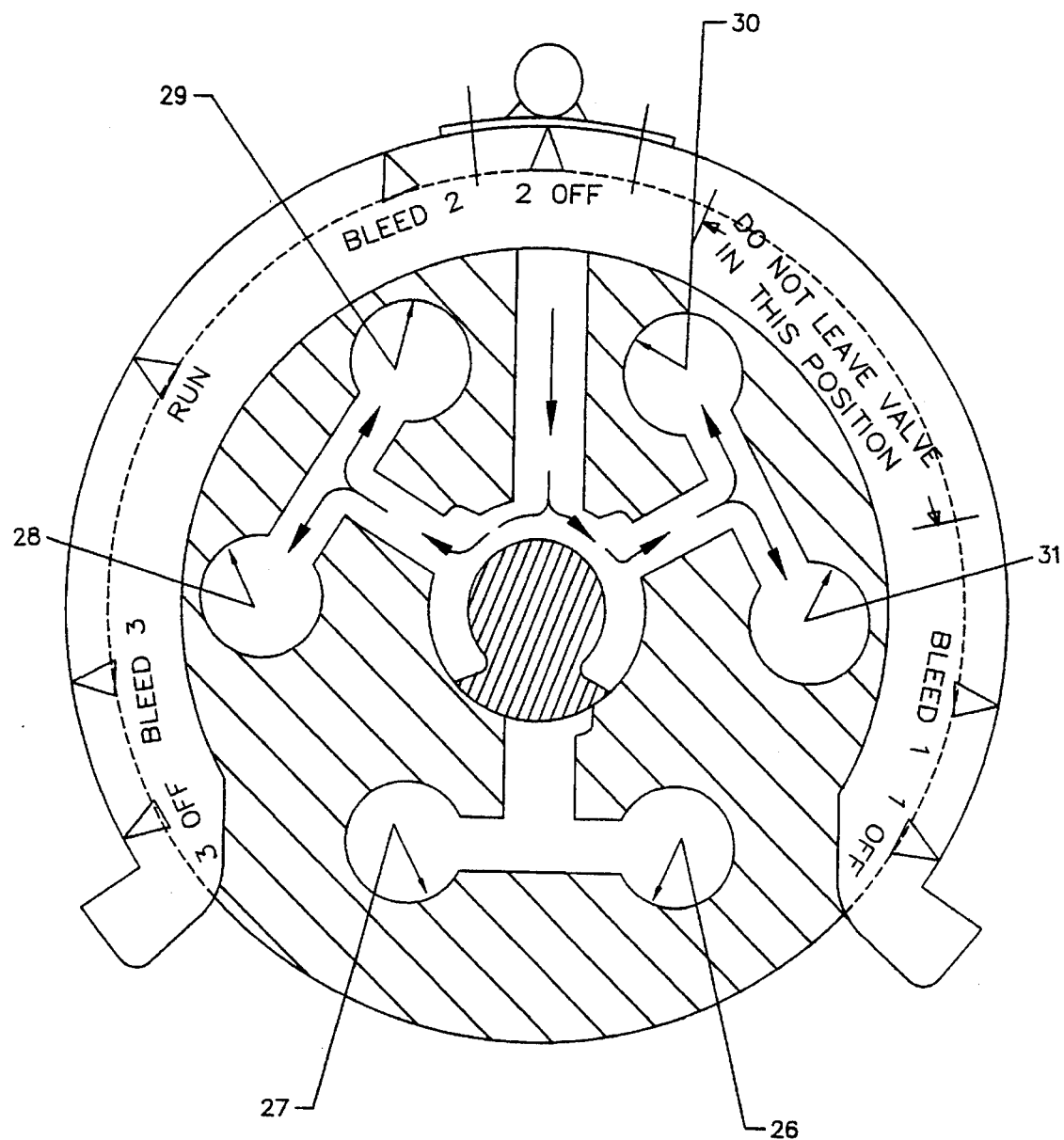
FIG. 17 is a diagram of polymer flow when a second pair of filters is shut off.
Figure 18:
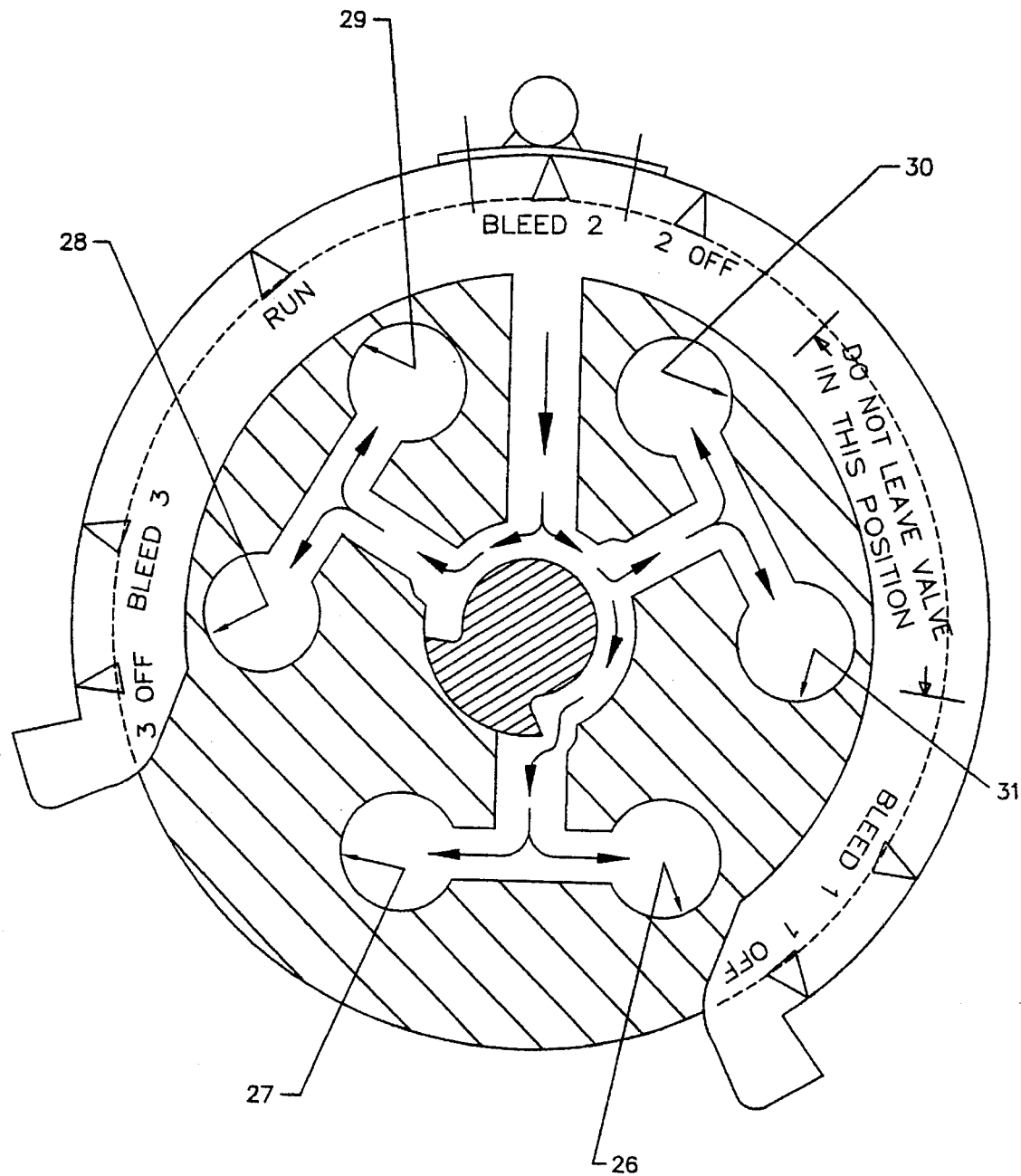
FIG. 18 is a diagram of polymer flow when the second pair of filters is being bled.
Figure 19:
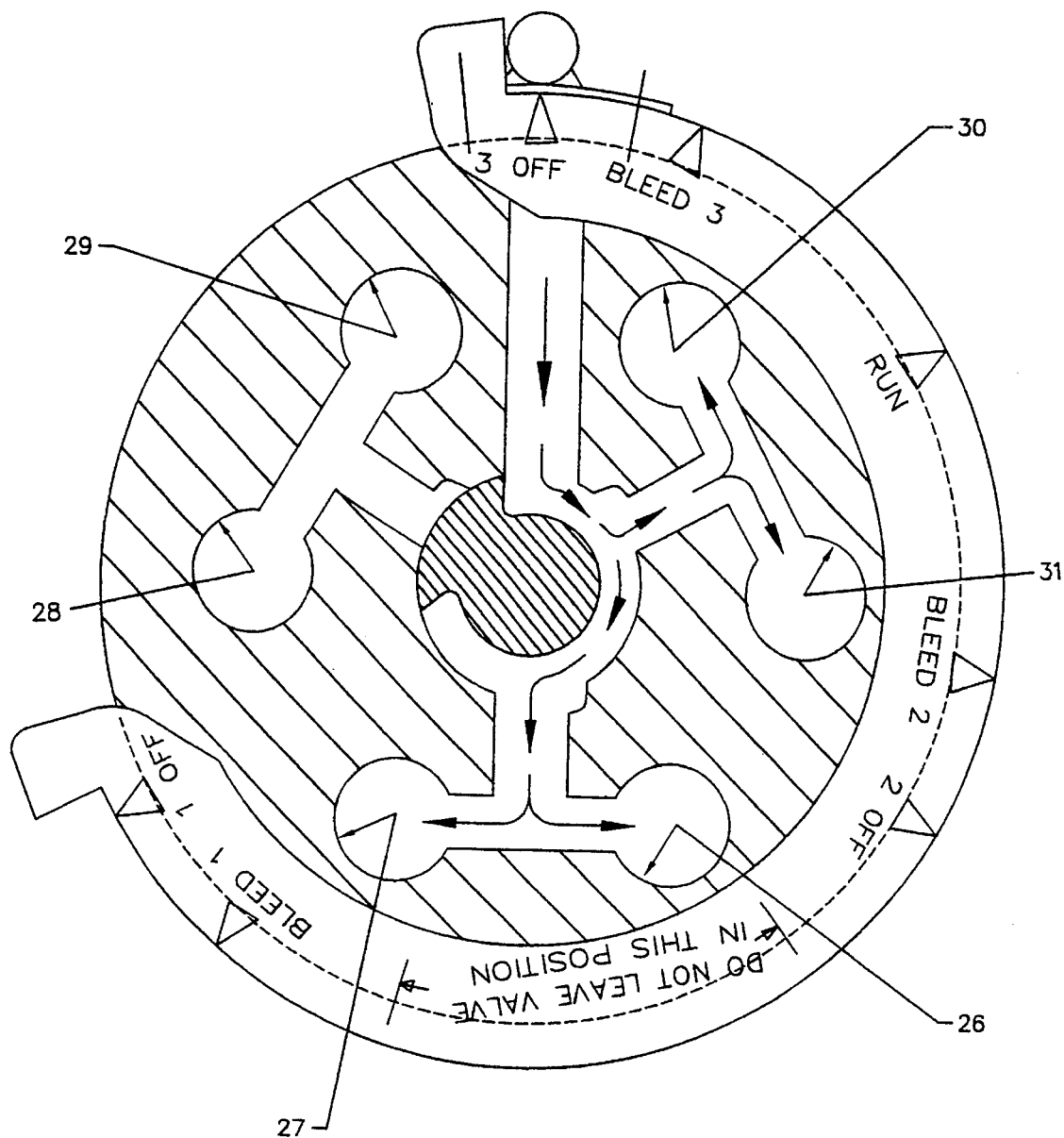
FIG. 19 is a diagram of polymer flow when a third pair of filters is shutoff.
Figure 20:
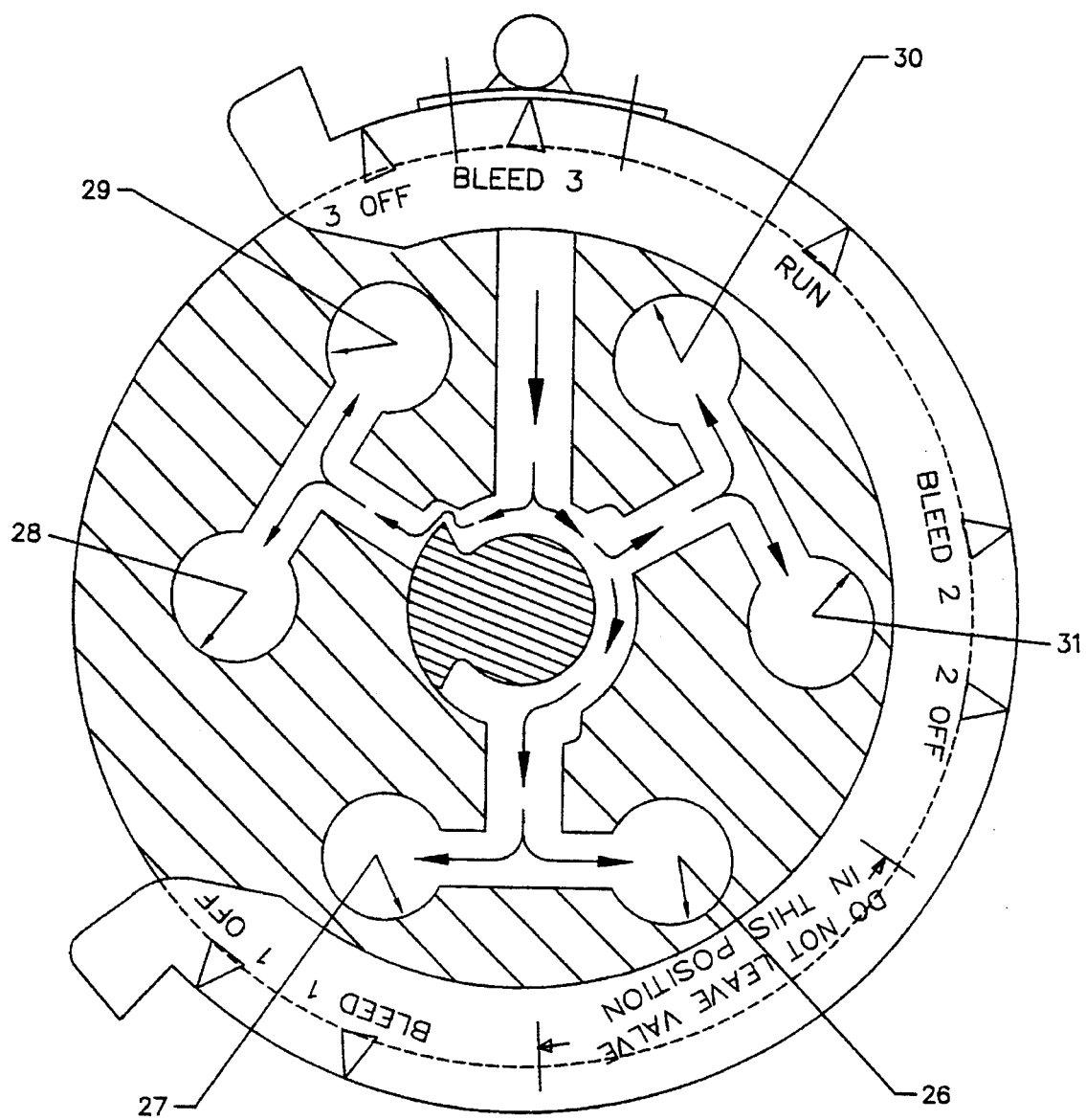
FIG. 20 is a diagram of polymer flow when the third pair of filters is being bled.

FIG. 14 diagrammatically shows the flow path into the lower flange through input passage 70, through input groove 74 and into all six filter cavities, 26 through 31, when the "RUN" marking on indicator plate 164 is aligned with stop pin 169, a neutral position blocking flow to none of the flow paths. Output flow is via output groove 72 and output passage 50, not shown in FIG. 14.

To replace a pair of filters the valve plug is rotated to a position completely blocking the flow path into the pair to be replaced but not obstructing flow to the other two pairs. The 270° input and output grooves 72, 74 in valve plug 14 continuously permit input and output flow so long as the ungrooved 90° segment does not rotate to a position blocking passages 50 and 70. This possibility is avoided because extensions 166 and 168 on indicator plate 164, rigidly attached to valve plug 14, are limited in rotation by stop pin 169 and thereby valve plug 14 is mechanically stopped from rotating to a closed position with passages 50 and 70 blocked.

The valve plug is, however, allowed to rotate to other positions whereby the ungrooved or blocking portion of the valve can be aligned with the feed and return passages 64 and 44 of any of the three filter pairs, as shown in FIGS. 15 through 20, to disengage and remove any particular filter pair and permit filter replacement without introducing air into the molten polymer.

Filter replacement is performed by turning hex head 162 and consequently indicator plate 164 until the "OFF" indication mark for the filter pair to be replaced is aligned with stop pin 169. This simultaneously aligns the open or removed 120° segment 165 of the indicator plate over the segment plate communicating with the selected filter pair, and also aligns the non-grooved portions of valve plug 14 with the input and output passages 64 and 44, respectively, communicating with the selected filter pair. The rotation of open segment 165 to a position over the selected segment plate simultaneously rotates the remainder of plate 165 to shield non-selected segments from access. Bleed valve 153 of the segment is opened slowly to verify that flow is discontinued to the selected filters and to release remaining fluid pressure in the now disconnected cavities. Bolts 154 securing the filter-supporting annular segment to housing 12 are removed and the segment and attached filters are withdrawn longitudinally from the housing for cleaning and for replacement with new or cleaned filters. As the filters are removed from their cavities they are scraped by the upper end of the cavity wall to remove excess polymer which remains in the cavity. The exposed housing upper end can now be cleaned and a new or cleaned and preheated segment assembly including filters and seals 133 is inserted back into the housing and secured with bolts 154. Pre-heating of the replacement filters assures that the polymer in the empty cavity wall not cool to below its melt temperature, particularly if the replacement filter pair is inserted substantially immediately after removal of the dirty filters. With bleed valve 153 open, hex head 162, indicator plate 164 and valve plug 14 are rotated to align the "BLEED" indicator for the replaced filter pair with the stop pin. This exposes, or opens, only bleed notch 65 of the replaced filters to input groove 74 while maintaining complete blockage of flow from the replaced filters into output groove 72. The replaced filters and filter cavities slowly fill with polymer passing through the bleed notch 65, forcing air out through bleed valve 153, followed by polymer with entrained air bubbles. After flow is observed to be free of air bubbles, bleed valve 153 is shut off and the hex head, indicator plate and valve plug are rotated to align "RUN" with the stop pin to open the now replaced filter pair to full flow by once again exposing the associated input and output passages to input and output grooves 74 and 72, respectively to complete the flow path.

An alternative flow pattern from input groove 74 through passages communicating directly into the sides of filter cavities 26 through 31 would be simpler to fabricate but would less efficiently direct the polymer along the filter surfaces, leaving regions of stagnant polymer adjacent the solid input ends of the filter elements. In a fabrication cost-saving embodiment filter cavities 26 through 31 can be bored as straight cylinders, rather than with tapers, but at the trade-off of longer average residence time of the polymer in the filter and much longer residence time for the polymer which passes through the filter screen just adjacent the upper or exit ends of the filters.

An alternative embodiment, shown in FIGS. 21 through 29, using a disc valve to control flow through the filter rather than a plug valve, comprises a central housing 200, an end assembly 201, a disc valve 202 and an input-output block 203.

Figure 22:
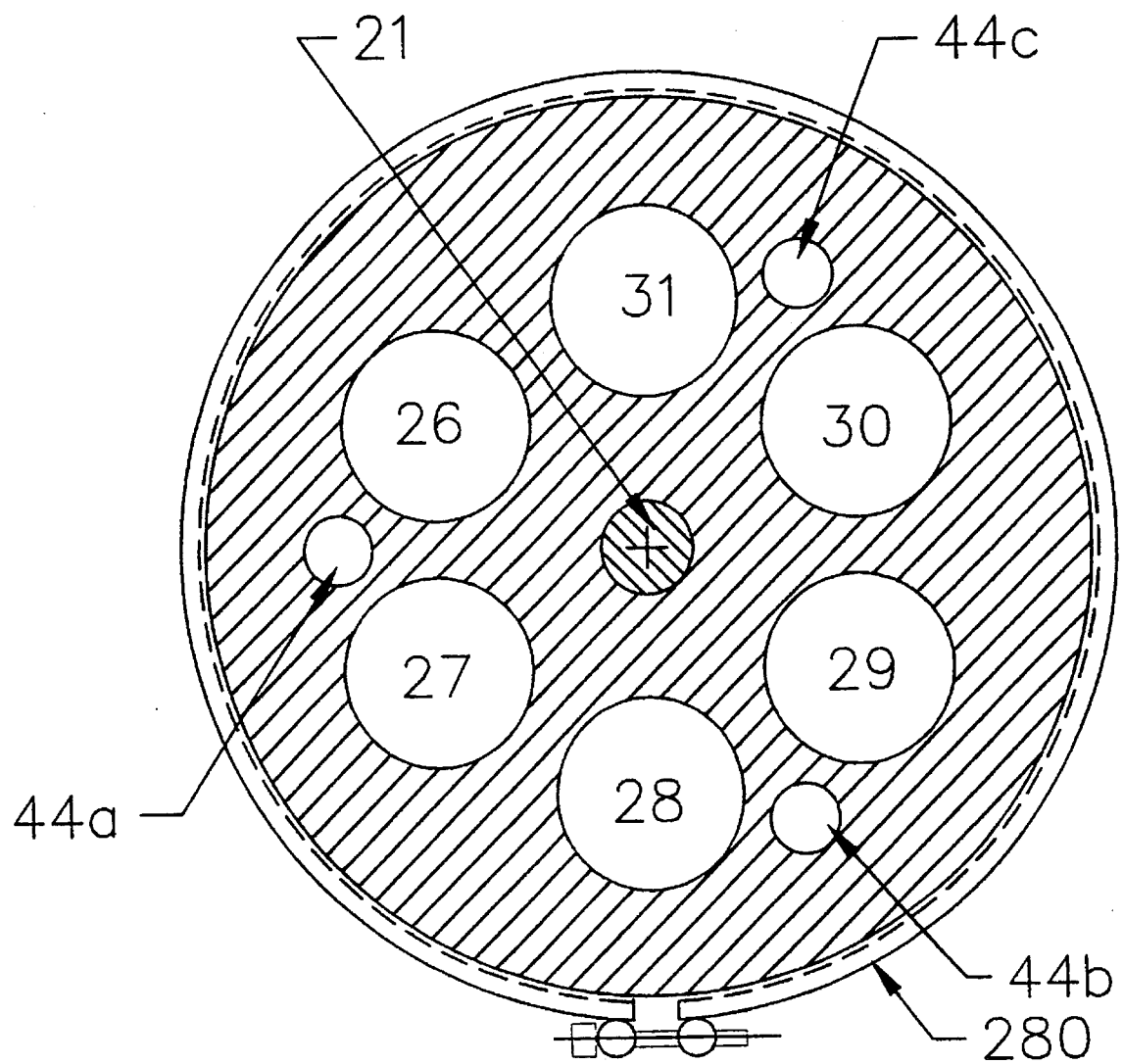
FIG. 22 is a view in vertical section taken along line 22—22 of FIG. 21.

The central housing 200 has three pairs of tapered filter cavities, 26 and 27, 28 and 29, and 30 and 31, each pair having a centrally disposed return passage 44a, 44b and 44c respectively, shown in FIG. 22 all extending longitudinally through the housing.

Figure 23:
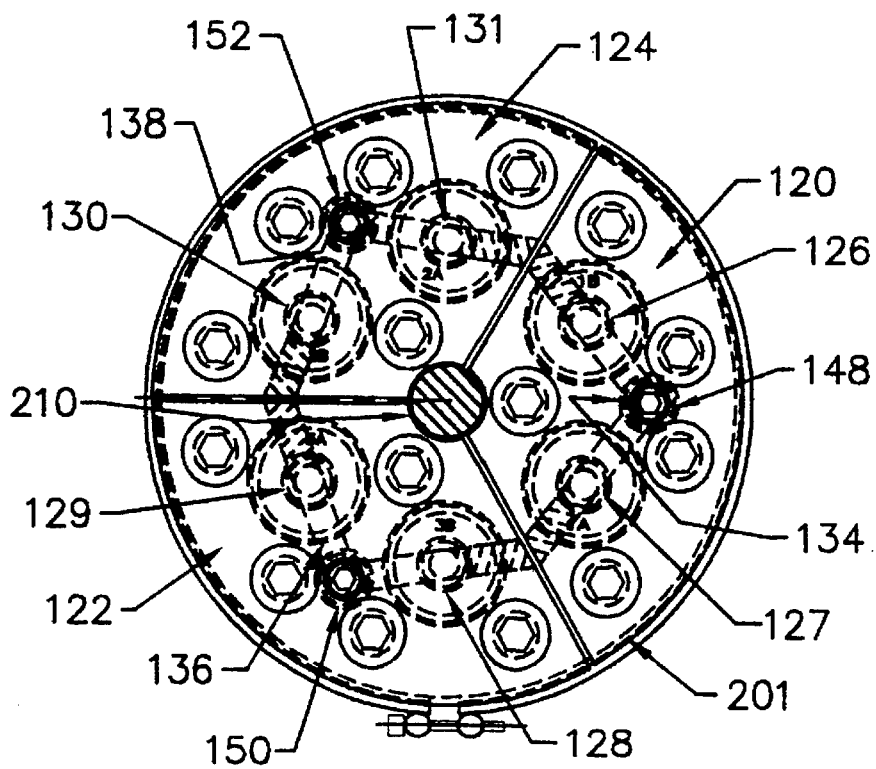
FIG. 23 is an end view taken along the direction of line 23—23 of FIG. 21.

End assembly 201 shown in FIG. 23 is comprised of three 120° segment plates 120, 122 and 124 removably attached to one end of central housing 200 and aligned with cavity pairs 26 and 27, 28 and 29, and 30 and 31, respectively. Threaded passages 126 and 127 are defined in segment plate 120 in registry with cavities 26 and 27 and supportably receive the threaded open ends of candle filters (not shown). Similarly threaded passages 128 and 129 are defined in plate 122 in registry with cavities 28 and 29; and threaded passages 130 and 131 are defined in plate 124 in registry with cavities 30 and 31. Passages 126 and 127 are connected by a cross-passage 134 within segment plate 120; similarly cross-passages 136 and 138 connect passage pair 128, 129 and pair 103, 131, respectively. Longitudinal passages 148, 150 and 152 connect cross-passages 134, 136 and 138 with housing return passages 44a, 44b and 44c, respectively, in housing 200 for corresponding filter cavity pairs and additionally communicate to atmosphere through bleed valves 153, shown in FIG. 21.

Figure 21:
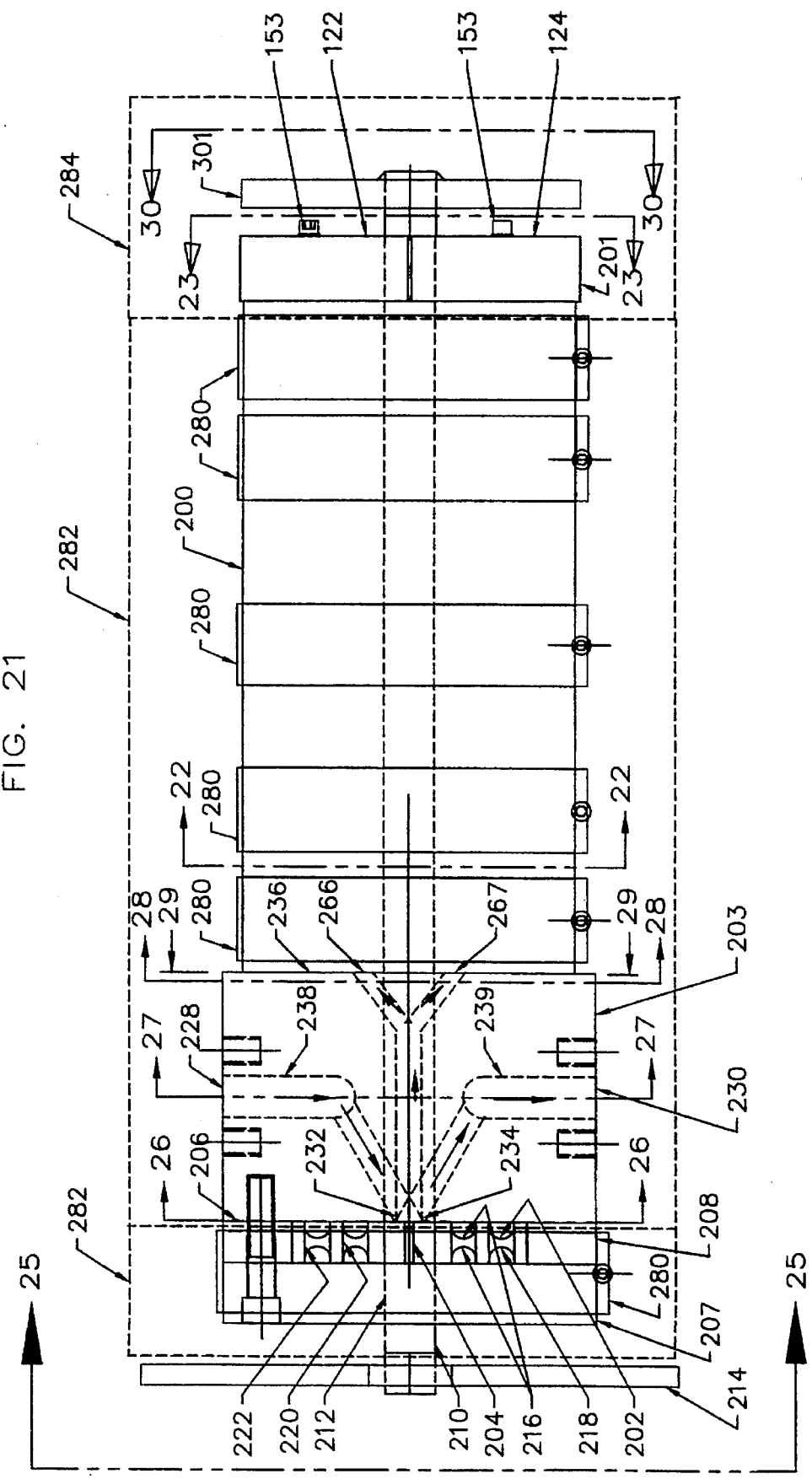
FIG. 21 is a plan view of an alternative disc valve embodiment of the present invention.
Figure 24:
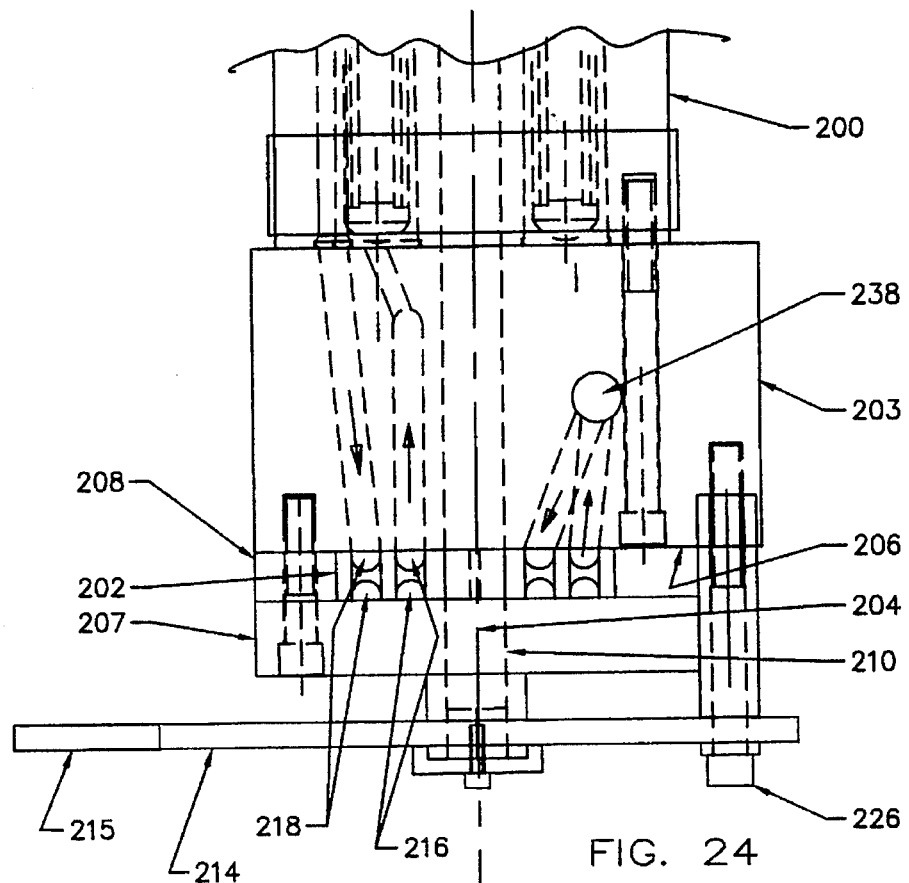
FIG. 24 is a broken top view in partial section of the large area polymer filter assembly of FIG. 21.
Figure 25:
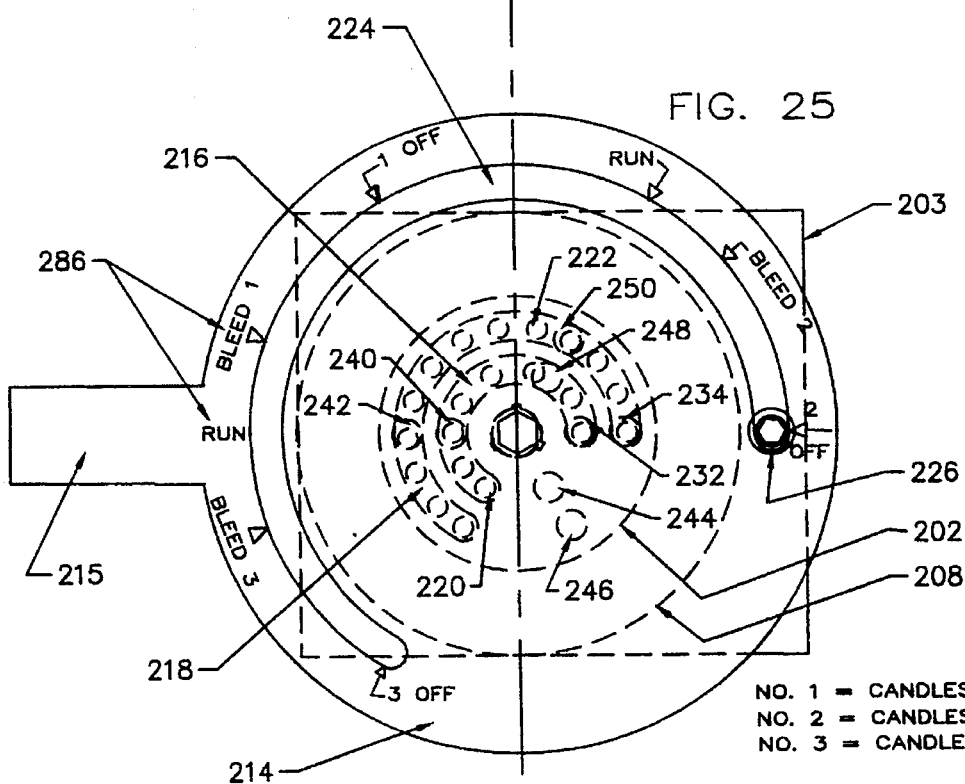
FIG. 25 is a view in vertical section taken along lines 25—25 of FIG. 21 and the indicator switch.
Figure 30:
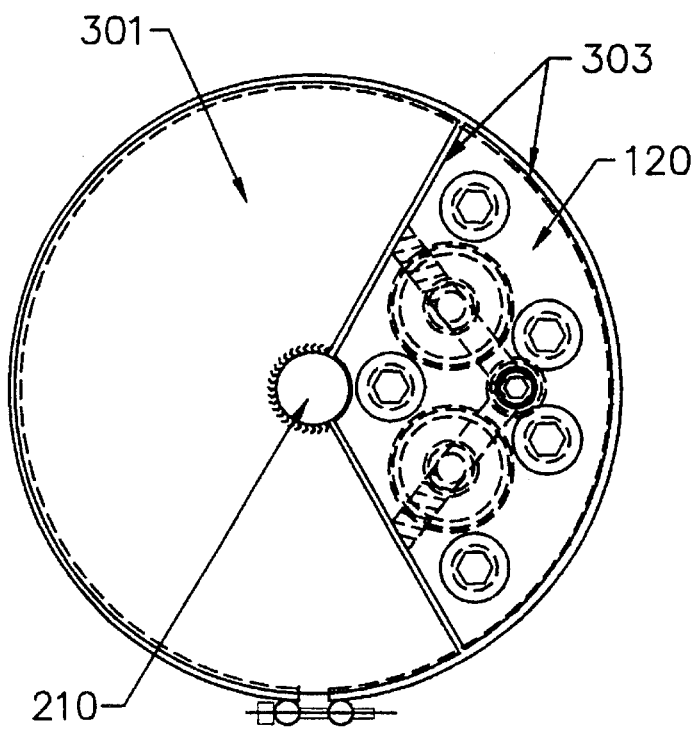
FIG. 30 is an end view with the end plate in place taken along the direction of lines 30—30 of FIG. 21.
Figure 27:
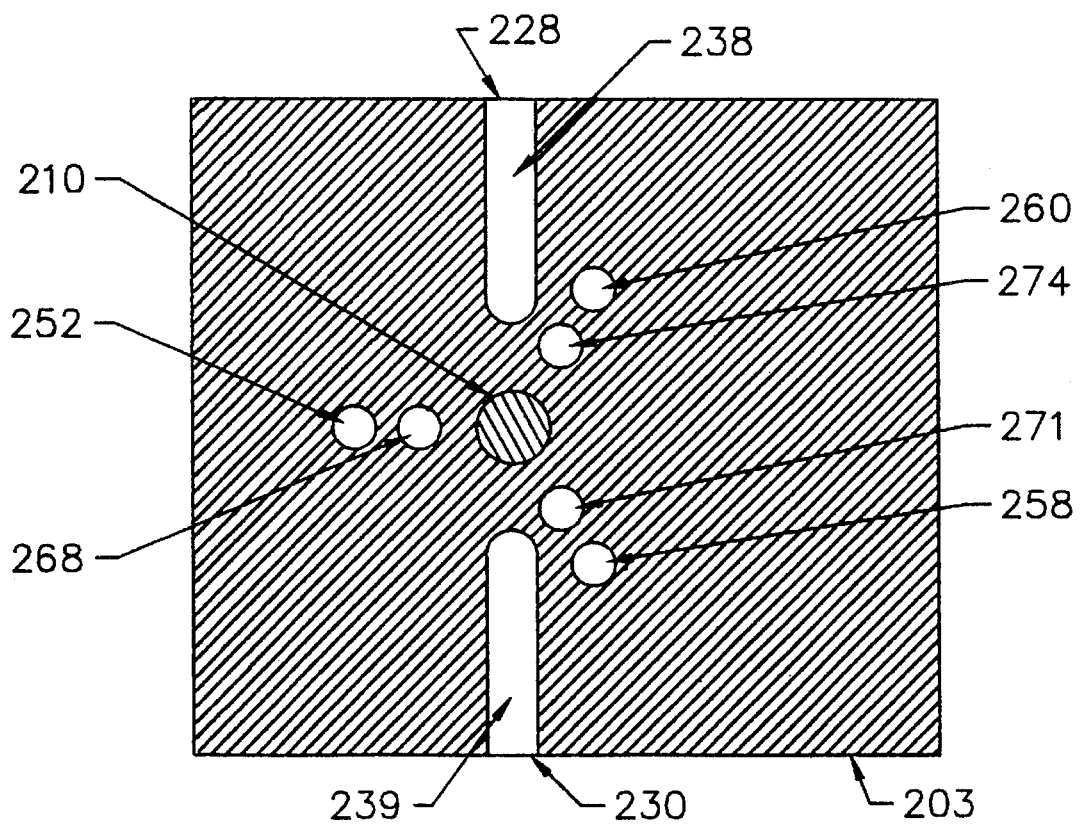
FIG. 27 is a view in vertical section taken along lines 27—27 of FIG. 21.
Figure 29:
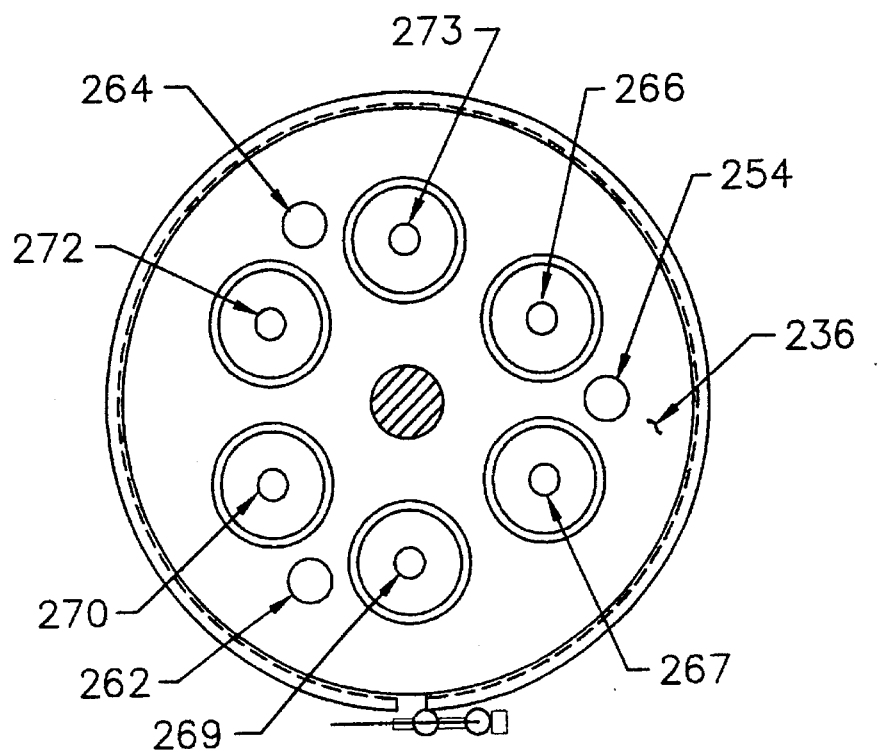
FIG. 29 is a view in vertical section taken along lines 29—29 of FIG. 21.
Figure 28:
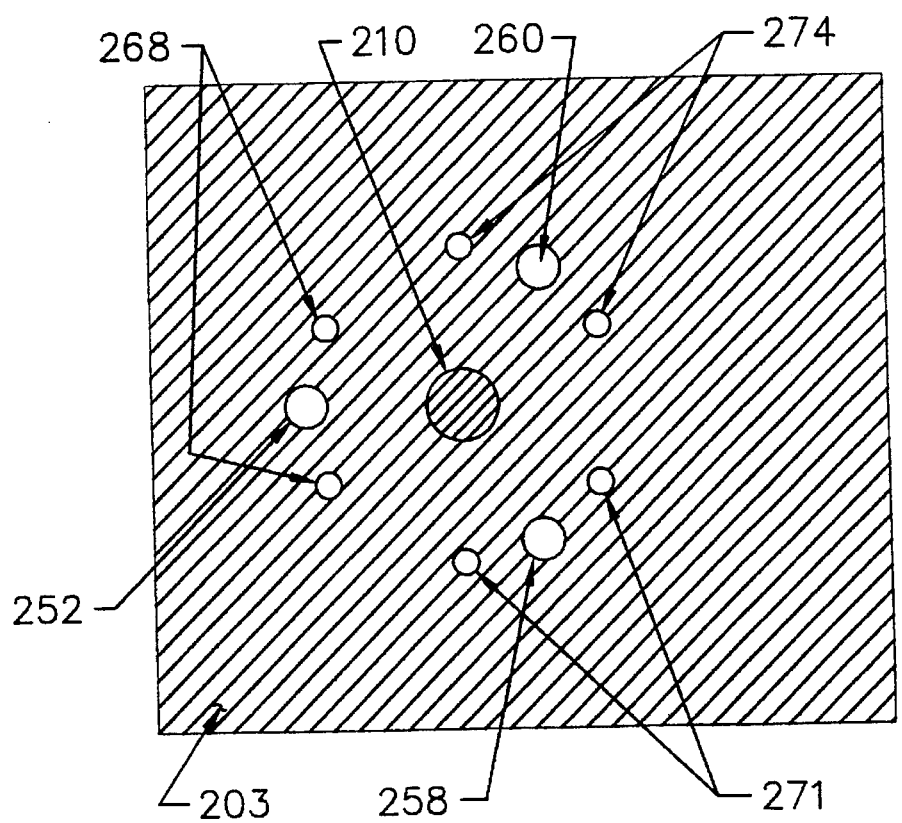
FIG. 28 is a view in vertical section taken along lines 28—28 of FIG. 21.

Disc valve 202 is a flat circular plate having an axis 204 and is held in a tight but rotatable fit against a first face 206 of input-output block 203 by a cover plate 207 and encased circumferentially by a retainer ring 208 as shown in FIGS. 21, 24 and 25. A shaft 210 extends axially outward from disc valve 202 through sealed orifice 212 in cover plate 207 and has a circular indicator-switching plate 214 rigidly attached radially thereto. Indicator-switching plate 214 has rigid grip handle 215 extending radially for effecting rotation of the plate, shaft and disc valve. Disc valve 202 has a pair of angularly aligned radially inner grooves 216 machined in opposite surfaces and extending arcuately about the central axis of the valve. A plurality of through holes 220 extend through the valve plate thickness to provide flow communication between grooves 216. A pair of angularly aligned radially outer grooves 218 are also machined in opposite surfaces of the disc valve in radially spaced relation to grooves 216. Grooves 218 similarly extend arcuately about the valve plate axis, and a plurality of through holes 220 provide flow communication between these grooves. The arc subtended by grooves 216, 218 is approximately 240°. Disc valve 202, with these two pairs of 240° grooves 216 and 218, is urged tightly but rotatably between input-output block 203 and cover plate 207 so that the groove pairs define inner and outer polymer distribution channels, respectively. Grooves 216 and 218 could alternatively be machined as a through slot, however disc strength is reduced in this configuration.

A 240° partially circumferentially arcuate slot through 224 having a radius somewhat larger than the radius of disc valve 202 is cut through indicator plate 214 in angular alignment with grooves 216 and 218 in disc valve 202. A bolt 226 having a shaft sized to fit snugly but slidingly through slot 224 is rigidly attached to the input-output block parallel to and at a radial distance from disc valve axis 204 corresponding to the radius of the mid-width of slot 224. Bolt 226 extends longitudinally beyond indicator plate 214, allowing indicator plate 214 and rigidly connected disc valve 202 to be rotated through a 240° partial revolution, stopped by the abutment of the ends of slot 224 against bolt 226.

Figure 26:
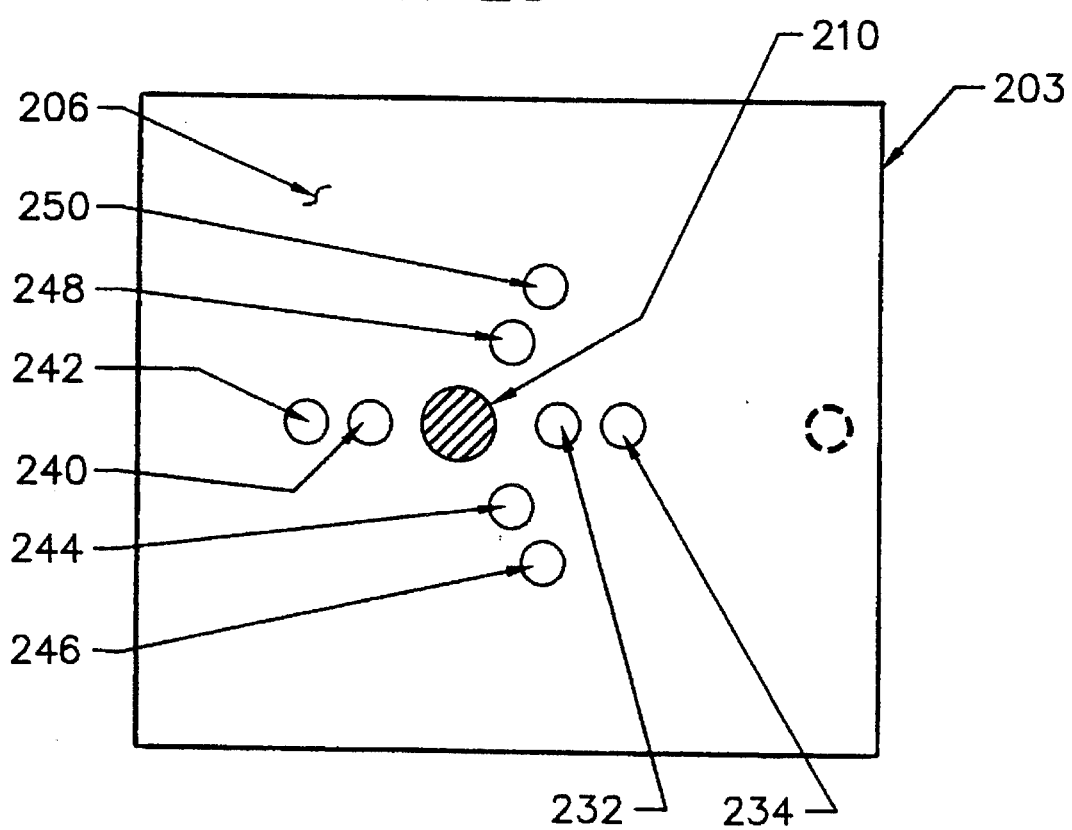
FIG. 26 is a view in vertical section taken along lines 26—26 of FIG. 21.

Input-output block 203 has input and output ports 228 and 230 respectively, shown in FIG. 21, for delivering unfiltered molten polymer to the assembly and returning filtered polymer to the main flow path. Input and output orifices 232 and 234 defined on face 206 of input-output block 203 shown in FIG. 26 are angularly aligned with bolt 226 relative to the disc valve axis 204 and communicate with inner and outer grooves 216 and 218 respectively. Input passage 238 shown in FIGS. 21 and 27 connects input port 228 with input orifice 232 and inner groove 216; similarly outer passage 239 connects output groove 218, output orifice 234 and output port 230.

Three additional pairs of orifices are located on disc valve face 206 of input-output block 203, radially spaced around axis 204 with the first orifice of each pair located at a radius equal to that of inner groove 216 and the second orifice of each pair located at a radius equal to that of outer grove 218. The first pair comprises an inner orifice 240 and an outer orifice 242 located diametrically opposite input and output orifices 232 and 234 respectively. The second and third orifice pairs 244, 246 and 248, 250, respectively, are equally spaced 120° counterclockwise and clockwise, respectively, from the first pair when viewed from the indicator plate direction. Outer orifice 242 communicates through passage 252 with an orifice 254 on the housing face 236 of input-output block 203 as shown in FIGS. 26 through 29. Orifice 254 is defined in registry with return passage 44a of filter cavity pair 26, 27. Similarly outer orifices 246 and 250 communicate through passages 258 and 260 to orifices 262 and 264 on housing face 236 in registry with passages 44b and 44c of filter cavity pairs 28, 29 and 30, 31 respectively.

Orifices 266 and 267 are defined on housing face 236 of input-output block 203 in registry with filter cavities 26 and 27 and communicate via split passage 268 with inner orifice 240 on face 206. Similarly orifices 269 and 270 are defined in registry with filter cavities 28 and 29 and communicate via split passage 271 with inner orifice 244 and orifices 272 and 273 are defined in registry with filter cavities 30 and 31 and communicate via split passage 274 with inner orifice 248. Orifices 266, 267, 269, 270, 272 and 273 deliver polymer to the open ends of filter cavities 26, 27, 28, 29, 30 and 31, respectively. Band heaters 280 shown in FIG. 21 encircle housing 200 and disc valve 202 to ensure temperature maintenance of the molten polymer, and insulation 282 encases the housing and disc valve. A removable insulation cap 284 is detachably fixed over end assembly 201.

Shaft 210 extends entirely through block 203, through housing 200 and through end assembly 201. A blocking plate 301 is affixed rigidly to the end of shaft 210 in a proper angular relationship with disc valve 202, the disc valve being keyed to shaft 210. A cutout 303 of just over 120° in plate 301 allows removal of one of the candle segments 120, 122, 124 only when it is in the "OFF" position.

Rotation of indicator plate 214 brings grooves 216 and 218 into registry with various combinations of input and output flow as described previously for the plug valve embodiment. Because the inner or supply groove 216 has a smaller diameter than outer groove 218, the inner groove 216 overlaps inner orifices 240, 244 and 248 slightly before outer groove 218 overlaps outer orifices 242, 246 and 250, respectively, allowing a bleed volume of polymer to flow into selected filter cavities while preventing similar flow out. This staggered overlapping relationship fulfills the bleed function provided by notches 65 in FIG. 7 in the first described embodiment.

Markings 286 on indicator plate 214 show an operator the proper setting for disengaging selected flow paths to allow uninterrupted access for cleaning and replacement of dirty filters, accomplished as before by bleeding the appropriate valve 153, removing the selected segment and attached filters, replacing or cleaning the removed filters and replacing the segment. Flow is bled into the replaced filters by placing the disc valve in position to allow only input flow while continuing to block output to the selected path until air and air-entrained polymer ceases to flow out of bleed valve 153, at which point the valve can be advanced to fully align both inner and outer grooves 216 and 218, respectively, with the input and output paths.

In use, unfiltered polymer flows into input-output block 203 through input port 228, continues through input passage 238 through orifice 232 and into inner or input groove 216 of disc valve 202. Polymer is allowed to flow out of groove 216 and into some or all of orifices 240, 244 and 248, depending on the rotational position of disc valve 202 as controlled by operator movement of grip handle 215. In the "RUN" position polymer flows to all filter paths through associated split passages 268, 271 and 274 through orifice pairs 266 and 267, 269 and 270, and 272 and 273, respectively. Polymer enters tapered filter cavities 26 through 31, passes through the filters and exits into end assembly 201 through orifices 126 through 131, respectively. Filtered flow returns through cross passages 134, 136 and 138, hence returning to the housing through longitudinal passages 148, 150 and 152 and along return passages 44a, 44b and 44c, and is received in orifices 254, 262 and 264 for return through passages 252, 258 and 260 to exit into disc valve outer groove 218 through orifices 242, 244 and 248, and hence through passage 239 to output port 230 and on toward extrusion.

It will be readily appreciated from the foregoing that the common valve means may also take the form of a short dual groove plug valve in place of the disc valve but located in a valve block at one end of the valve housing, similar to the disc valve arrangement. Such an embodiment may be viewed as a combination of the plug and disc valve features.

It will also be appreciated that any number of filter elements can be combined in a housing and valve plug combination according to the present invention, and flow can be directed to individual filter elements as well as pairs and combinations. Stated otherwise, the filters/cavities, are preferably arranged in n groups, each group including m filters/cavities, where n is preferably three or greater and m can be one, two (i.e., pairs), three or more. The common valve delivers input polymer to chosen groups in parallel flow relation, and conducts output filtered polymer from those chosen groups. The filters are replaced m at a time (i.e., one group at a time). In the preferred embodiment, as described above, n=3 and m=2. Additionally filter elements of designs other than the described and preferred candle-type can be incorporated into the large-area polymer filter of the present invention.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A filter apparatus for uninterruptably filtering molten polymer comprising:

supply means for flowing molten polymer under pressure;

a plurality of separate filter paths containing respective removable filters therein;

a common valve means for selectively apportioning said flowing polymer among said plurality of filter paths in parallel, said valve means having a normally neutral position providing equal flow into and out from each of said filter paths, a first plurality of positions wherein flow is completely blocked into and out from a respective selected filter path, and a second plurality of positions wherein trickle flow is allowed into said selected path while flow out from said selected path is completely blocked;

means for selectively bleeding air and air-entrained polymer from said selected path; and passage means for combining polymer flow from said plurality of separate filter paths into a common outflow path.

2. The filter apparatus of claim 1 wherein said plurality of separate filter paths comprises at least three filter paths arranged in parallel flow relation.

3. The filter apparatus of claim 2 wherein each filter path includes a pair of filter elements arranged in parallel flow relation.

4. The filter apparatus of claim 3 further comprising cover means structurally interconnected with said common valve means for providing access for removal of filters only from said selected path and for installing clean filters in said selected path.

5. The filter apparatus of claim 1 further comprising shielding means attached to and movable with said common valve means to block access to all of said plurality of separate filter paths except said completely flow-blocked selected path.

6. The filter apparatus of claim 5 further comprising a mechanical stop to prevent said valve means from assuming a position preventing flow into all of said filter paths simultaneously.

7. The filter apparatus of claim 5 wherein said filter paths each include at least one filter cavity, said cavities sized to receive at least one candle filter.

8. The filter apparatus of claim 5 wherein said cavities each have a cross-section that decreases in a downstream flow direction whereby as molten polymer flows through said each cavity the volume of stagnantly entrapped polymer in that cavity is reduced.

9. The filter apparatus of claim 1 further comprising a mechanical stop to prevent said valve means from assuming a position preventing flow into all of said filter paths simultaneously.

10. The filter apparatus of claim 1 wherein said filter paths each include at least one filter cavity, said cavities sized to receive at least one candle filter.

11. The filter apparatus of claim 10 wherein said cavities each have a cross-section that decreases in a downstream flow direction whereby as molten polymer flows through said each cavity the volume of stagnantly entrapped polymer in that cavity is reduced.

12. The filter apparatus of claim 1 wherein said common valve means comprises a generally cylindrical plug rotatably mounted in a borehole in a housing, said plug having first and second longitudinally spaced partially circumferential grooves in angular registry, said housing borehole having first and second sets of angularly spaced orifices defined therein in longitudinally spaced relation to be in registry with said first and second grooves, respectively, said first set of orifices being in longitudinal registry with said second set of orifices, one of said first set of orifices communicating with said supply means, one of said second set of orifices being in longitudinal registry with said one of said first set of orifices being in longitudinal registry with said one of said first set of orifices and communicating with said common outflow path, remaining orifices of said first set of orifices providing inlets to said filter paths, remaining orifices of said second set of orifices providing outlets from said filter paths, wherein said plug is selectively rotatable to a position wherein said first groove is in communicating radial registry with selected orifices of said first set of orifices and said second groove is in communicating radial registry with correspondingly selected orifices of said second set orifices to thereby complete flow paths from said supply means through said valve means to selected filter paths and from said selected filter paths through said valve means to said common outflow path.

13. The filter apparatus of claim 12 wherein said plug and borehole are longitudinally tapered in said housing.

14. The filter apparatus of claim 12 further comprising an indicator plate rotatable with said plug, said indicator plate positioned to block access for filter removal to all but said selected filter path.

15. The filter apparatus of claim 1 where the said common valve means comprises a disc rotatably mounted in a close-fitting housing, said disc having first and second concentric arcuate grooves in angular registry defined therein for polymer flow, said housing having first and second sets of angularly spaced orifices defined therein in radially spaced relation to be in registry with said first and second grooves, respectively, said first set of orifices being in angular registry with said second set of orifices, one of said first set of orifices communicating with said supply means, one of said second set of orifices being in angular registry with said one of said first set of orifices and communicating with said common outflow path, remaining orifices of said first set of orifices providing inlets to said filter paths, remaining orifices of said second set of orifices providing outlets from said filter paths, wherein said disc is selectably rotatable to a position wherein said first groove is in communicating angular registry with correspondingly selected orifices of said second set of orifices to thereby complete flow paths from said supply means through the valve means to selected filter paths and from selected filter paths through the valve means to said common outflow path.

16. The filter apparatus of claim 15 further comprising an indicator plate rotatable with said disc, said indicator plate positioned to block access for filter removal to all but said selected filter path.

17. A filter apparatus for molten polymer having plural filter elements and wherein selected filter elements can be replaced without interrupting polymer flow through the apparatus, said apparatus comprising:

an elongate housing;

an inlet passage defined in said housing for receiving flowing molten polymer under pressure;

multiple cavities extending longitudinally through said housing, said cavities being oriented in n groups, where n has a value of at least one, each group comprising m cavities where m has a value of at least two;

a plurality of elongate candle filters, each disposed in a respective one of said cavities;

a common valve means for selectively delivering the received flowing polymer to said groups of cavities in parallel flow relation and conducting polymer from said filters in said cavities;

said common valve means including at least (n+1) operative positions, wherein in each of n positions said valve means blocks polymer flow into a respective group of said cavities and blocks polymer flow from filters disposed in said respective group of cavities, and in one position said valve means permits polymer flow into all of said groups cavities and out from all of said filters;

plural cross passage means, each in a respective cavity group for conducting flowing polymer received from said valve means in parallel to each cavity in said respective group; and outlet passage means for combining polymer outflow from all of said filters that are not blocked by said common valve means.

18. The filter apparatus according to claim 17 wherein the number of said groups is 3 and the number of said cavities is 2.

19. The large area filter apparatus according to claim 17 wherein the number of said groups is equal to at least three, and the number of said cavities is greater than one.

20. The filter according to claim 17 further comprising:

n segment plates each covering a respective group of cavities and secured to the filters disposed in said respective group of cavities to permit simultaneous removal of said each cover and all filters when dirty from said respective group of cavities and simultaneous replacement of all clean filters and said each cover.

21. The filter apparatus of claim 20 further comprising:

an indicator plate secured to and movable with said common valve means to shield said segment plates, said indicator plate having an opening therein to provide access only to the segment plate for the group of cavities having filters to which and from which polymer flow is blocked by said common valve means.

22. The filter apparatus of claim 17 wherein said common valve means comprises a generally cylindrical plug rotatably mounted in a borehole in a housing, said plug having first and second longitudinally spaced partially circumferential grooves in angular registry, said housing borehole having first and second sets of angularly spaced orifices defined therein in longitudinally spaced relation to be in registry with said first and second grooves, respectively, said first set of orifices being in longitudinal registry with said second set of orifices, one of said first set of orifices communicating with said inlet passage, one of said second set of orifices being in longitudinal registry with said one of said first set of orifices and communicating with said outlet passage, remaining orifices of said first set of orifices providing inlets to said groups of cavities, remaining orifices of said second set of orifices providing outlets from said groups of cavities, wherein said plug is selectably rotatable to a position wherein said first groove is in communicating radial registry with selected orifices of said first set of orifices and said second groove is in communicating radial registry with correspondingly selected orifices of said second set orifices to thereby complete flow paths from said inlet passage through said valve means to selected groups of cavities and from said selected groups of cavities through said valve means to said outlet passage.

23. The filter apparatus of claim 17 where said valve means comprises a disc rotatably mounted in a close-fitting housing, said disc having first and second concentric arcuate grooves in angular registry defined therein for polymer flow, said housing having first and second sets of angularly spaced orifices defined therein in radially spaced relation to be in registry with said first and second grooves, respectively, said first set of orifices being in angular registry with said second set of orifices, one of said first set of orifices communicating with said inlet passage, one of said second set of orifices being in angular registry with said one of said first set of orifices and communicating with said outlet passage, remaining orifices of said first set of orifices providing inlets to said groups of cavities, remaining orifices of said second set of orifices providing outlets from said groups of cavities, wherein said disc is selectably rotatable to a position wherein said first groove is in communicating angular registry with correspondingly selected orifices of said second set of orifices to thereby complete flow paths from said inlet passage through said valve means to selected groups of cavities and from selected groups of cavities through said valve means to said outlet passage.

24. A filter apparatus for uninterruptably filtering molten polymer comprising:

supply means for flowing molten polymer under pressure;

a plurality of separate filter paths containing respective removable filters therein;

valve means for simultaneously apportioning said flowing polymer among said plurality of filter paths in parallel, said valve means having a normally neutral state wherein substantially equal flow is simultaneously provided into and out from each of said filter paths, a first plurality of states in each of which flow is completely blocked into and out from a respective selected filter path, and a second plurality of states in each of which trickle flow is allowed into a respective selected filter path while flow out therefrom is completely blocked;

means for selectively bleeding air and air-entrained polymer from said respective selected path in said second state; and passage means for combining polymer flow from said plurality of separate filter paths into a common outflow path.

25. The filter apparatus of claim 24 wherein said filter paths each include at least one filter cavity, said cavities sized to receive at least one candle filter, and wherein said cavities each have a cross-section that decreases in a downstream flow direction whereby as molten polymer flows through said each cavity the volume of stagnantly entrapped polymer in that cavity is reduced.

26. The filter apparatus of claim 24 wherein said valve means comprises a generally cylindrical plug rotatably mounted in a borehole in a housing, said plug having first and second longitudinally spaced partially circumferential grooves in angular registry, said housing borehole having first and second sets of angularly spaced orifices defined therein in longitudinally spaced relation to be in registry with said first and second grooves, respectively, said first set of orifices being in longitudinal registry with said second set of orifices, one of said first set of orifices communicating with said supply means, one of said second set of orifices being in longitudinal registry with said one of said first set of orifices and communicating with said common outflow path, remaining orifices of said first set of orifices providing inlets to said filter paths, remaining orifices of said second set of orifices providing outlets from said filter paths, wherein said plug is selectably rotatable to a position wherein said first groove is in communicating radial registry with selected orifices of said first set of orifices and said second groove is in communicating radial registry with correspondingly selected orifices of said second set orifices to thereby complete flow paths from said supply means through said valve means to selected filter paths and from said selected filter paths through said valve means to said common outflow path.

27. The filter apparatus of claim 26 wherein said plug and borehole are longitudinally tapered in said housing, and further comprising an indicator plate rotatable with said plug, said indicator plate positioned to block access for filter removal to all but said selected filter path.

28. The filter apparatus of claim 24 wherein said valve means comprises a disc rotatably mounted in a close-fitting housing, said disc having first and second concentric arcuate grooves in angular registry defined therein for polymer flow, said housing having first and second sets of angularly spaced orifices defined therein in radially spaced relation to be in registry with said first and second grooves, respectively, said first set of orifices being in angular registry with said second set of orifices, one of said first set of orifices communicating with said supply means, one of said second set of orifices being in angular registry with said one of said first set of orifices and communicating with said common outflow path, remaining orifices of said first set of orifices providing inlets to said filter paths, remaining orifices of said second set of orifices providing outlets from said filter paths, wherein said disc is selectably rotatable to a position wherein said first groove is in communicating angular registry with correspondingly selected orifices of said second set of orifices to thereby complete flow paths from said supply means through the valve means to selected filter paths and from selected filter paths through the valve means to said common outflow path.

29. The filter apparatus of claim 28 further comprising an indicator plate rotatable with said disc, said indicator plate positioned to block access for filter removal to all but said selected filter path.

* * * * *